(12) United States Patent
Kumano et al.

(10) Patent No.: US 7,505,659 B2
(45) Date of Patent: Mar. 17, 2009

(54) OPTICAL FIBER AND OPTICAL TRANSMISSION LINE AND OPTICAL COMMUNICATION SYSTEM INCLUDING SUCH OPTICAL FIBER

(75) Inventors: Naomi Kumano, Chiyoda-ku (JP); Ryuichi Sugizaki, Chiyoda-ku (JP); Kazunori Mukasa, Chiyoda-ku (JP); Takeshi Yagi, Chiyoda-ku (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 12/213,509

(22) Filed: Jun. 20, 2008

(65) Prior Publication Data

US 2008/0292257 A1  Nov. 27, 2008

Related U.S. Application Data

(62) Division of application No. 11/976,780, filed on Oct. 29, 2007, now abandoned, which is a division of application No. 11/522,315, filed on Sep. 18, 2006, now Pat. No. 7,321,711, which is a division of application No. 11/022,817, filed on Dec. 28, 2004, now Pat. No. 7,123,803, which is a division of application No. 10/365,613, filed on Feb. 13, 2003, now Pat. No. 6,856,744.

(60) Provisional application No. 60/391,948, filed on Jun. 28, 2002, provisional application No. 60/396,737, filed on Jul. 19, 2002.

(30) Foreign Application Priority Data

| Feb. 13, 2002 | (JP) | ............... 2002-035526 |
| Mar. 4, 2002 | (JP) | ............... 2002-057482 |
| Jul. 24, 2002 | (JP) | ............... 2002-214742 |
| Nov. 20, 2002 | (JP) | ............... 2002-337107 |

(51) Int. Cl.
*G02B 6/00* (2006.01)
(52) U.S. Cl. ...................... 385/123; 385/100
(58) Field of Classification Search ................ None
See application file for complete search history.

(56) References Cited

U.S. PATENT DOCUMENTS

| 5,838,867 | A | 11/1998 | Onishi et al. |
| 5,905,838 | A | 5/1999 | Judy et al. |
| 6,181,858 | B1 | 1/2001 | Kato et al. |
| 6,415,089 | B2 | 7/2002 | Kato et al. |
| 6,470,126 | B1 | 10/2002 | Mukasa |
| 6,535,677 | B1 | 3/2003 | Tanaka et al. |
| 6,546,177 | B1 | 4/2003 | Matsuo et al. |
| 6,556,758 | B2 | 4/2003 | Kato |
| 6,567,596 | B2 | 5/2003 | Kato et al. |
| 6,574,405 | B2 | 6/2003 | Mukasa |
| 6,591,048 | B2 | 7/2003 | Mukasa |
| 6,614,976 | B2 | 9/2003 | Kato et al. |
| 6,633,714 | B2 | 10/2003 | de Montmorillon et al. |
| 6,658,190 | B2 | 12/2003 | Hirano et al. |
| 6,661,958 | B2 | 12/2003 | Hirano et al. |
| 6,674,566 | B2 | 1/2004 | Fludger et al. |
| 6,687,441 | B1 * | 2/2004 | Li ........................ 385/123 |
| 6,819,847 | B2 | 11/2004 | Matsuo et al. |
| 2003/0123826 | A1 | 7/2003 | Mukasa |
| 2003/0133678 | A1 | 7/2003 | Mukasa |
| 2004/0033041 | A1 | 2/2004 | Mukasa et al. |
| 2004/0126074 | A1 | 7/2004 | Bickham et al. |

FOREIGN PATENT DOCUMENTS

| GB | 2 116 744 | 9/1983 |
| JP | 58-168004 | 10/1983 |
| JP | 11-281840 | 10/1999 |
| JP | 2002-071998 | 3/2002 |
| JP | 2003-287642 | 10/2003 |
| WO | WO 00/63732 | 10/2000 |

OTHER PUBLICATIONS

Patent Office of the People's Republic of China, Notification of First Office Action, dated Apr. 21, 2006.
Notification of Refusal Reason dated Dec. 4, 2006 for Application No. JP2002-214742.
Notification of Refusal Reasons (Application No. 2002-337107) dated Jun. 26, 2007.
S. Kawai, et al., *Wide Bandwidth and Long Distance WDM Transmission Using Highly Gain-Flattened Hybrid Amplifier*, Japan-Electrics-Information-Communication Society, 1999 Meeting Paper, Communication 2, Mar. 8, 1999, p. 493, B-10-132.

* cited by examiner

*Primary Examiner*—Sung H Pak
(74) *Attorney, Agent, or Firm*—Eric J. Robinson; Robinson Intellectual Property Law Office, P.C.

(57) ABSTRACT

Optical fibers to form an optical transmission line suitable for WDM transmission in a wide-spreading wavelength band, having the following characteristics and parameters: a dispersion in absolute value of 0.5 ps/nm/km to 9 ps/nm/km in a wavelength band of 1430 nm to 1625 nm, a dispersion slope in absolute value of 0.04 ps/nm$^2$/km or less at a wavelength of 1550 nm, a mode field diameter of 7 μm or less at a wavelength of 1550 nm and a cable cutoff wavelength of less than 1430 nm; core 11 surrounded by cladding 7, core 11 being at least two-layered (first layer 1 at the center and second layer 2 surrounding the first layer; relative refractive index of glass layer Δ1 with reference to the cladding being adjusted to not less than 0.6 but not more than 1.6%, relative refractive index of second layer Δ2 with reference to the cladding being adjusted to a negative value.

19 Claims, 26 Drawing Sheets

OPTICAL FIBER AND OPTICAL TRANSMISSION LINE AND OPTICAL COMMUNICATION SYSTEM INCLUDING SUCH OPTICAL FIBER

FIELD OF THE INVENTION

The present invention relates to optical fiber suitable for wavelength division multiplexing (WDM) transmission, and optical transmission line, and optical communications system using such optical fibers.

BACKGROUND OF THE INVENTION

The volume of communication information data tends to greatly increase with the advancement of the information society necessitating the widespread use of wavelength division multiplexing (WDM) transmission in the field of telecommunications. WDM transmission enables to transmit optical signals of plurality of wavelengths through a single optical fiber.

The erbium doped fiber amplifier (EDFA) is today developed and applied to amplify the optical signals at points of relay in a WDM transmission system. The EDFA does not require a process of transforming optical signals into electric signals at each wavelength, accelerating the spreading of WDM transmission worldwide.

In the meantime, Raman amplifiers with the Raman amplification are of great interest as a new optical amplifier. The Raman amplification is a system which amplifies light using the stimulated emission in Raman scattering. The amplification efficiency depends largely on the non-linearity of an optical fiber. As usual the more the non-linearity is enhanced, the more the efficiency is improved.

FIG. 23 is a diagram for a example of optical transmission system applying the Raman amplification. The output of the Signal Light Sources 4a1 to 4an have different wavelengths of signal lights and are multiplexed by Optical Multiplexer 15.

The output of the Pump Light Sources 3a1 to 3an have different wavelengths of pump lights, and are in a multimode lasing. The pump lights from Pump Light Sources 3a1 to 3an are mixed by Optical Multiplexer 16. The pump lights and signal lights (WDM signal lights) are multiplexed by Optical Multiplexer 10 and led into Optical Fiber 8 in the optical transmission line.

The WDM signal lights in Optical Fiber 8 propagate as being Raman amplified till the receiving end, and then are demultiplexed for the respective wavelengths by Optical Demultiplexer 9, and received by Optical Receivers 7a1 to 7an.

FIG. 23 is an example of co-propagation pumping system in which the pump lights for the Raman amplification propagate in the same direction as the transmission signal light in an optical fiber (Optical Fiber 8). By contrast, a second example, as shown in FIG. 24, is a counter propagation pumping system in which pump lights propagate in the reverse direction to the transmission signal lights in an optical fiber (Optical Fiber 8).

Light Sources 13a1 to 13an in FIG. 24 output pump lights, which are multiplexed by Optical Multiplexer 26. The pump lights were coupled to the Optical Multiplexer 20 to propagate in the reverse direction to signal lights.

Moreover, a third example shown in FIG. 25 is a bi-directional pumping system in which pump lights propagate in both directions in an optical fiber (Optical Fiber 8).

Concurrently in the same diagram, the pump lights from Pump Light Sources 3a1 to 3an in FIG. 25 are multiplexed by Optical Multiplexer 16, and those from Pump Light Sources 13a1 to 13an are multiplexed by Optical Multiplexer 26. The pump lights propagating in the same and reverse direction to the transmission signals are multiplexed with transmission signals by Optical Multiplexer 10 and 20, respectively and then fed into Optical Fiber 8. It is preferable to apply a bi-directional pumping for making the light intensity longitudinally more uniform throughout the Optical Fiber 8.

If Optical Fiber 8 is made of silica, the peak gain for the Raman amplification appears at a frequency 13 THz lower than the frequency of the pump light source (wavelength about 100-110 nm longer). In brief, in the Raman amplification there are amplified signal lights at a 100-110 nm long wavelength from the pump light wavelengths.

Consequently, as for an optical transmission system in a wavelength band of 1.5 µm, for instance, a maximum Raman gain can be obtained for signal lights at 1580 nm when input pump light is at 1480 nm.

The optical fiber transmission characteristics depend on the transmission loss and chromatic dispersion. A single mode fiber offers a single mode of signal propagation as free from mode dispersion, and accordingly its transmission band is limited by material dispersion and waveguide dispersion. Conventional single mode fibers have a zero dispersion at a wavelength of 1.3 µm band (hereinafter called at 1.3 µm) or thereabout, and a lowest transmission loss in a wavelength band of 1.5 µm (hereinafter called in 1.5 µm). Against this backdrop, a plan for Dispersion Shifted Fiber (DSF) was proposed in an attempt to shift a zero dispersion from 1.3 µm band to 1.5 µm band.

It is difficult to shift the zero dispersion from 1.3 µm to 1.5 µm by changing the material dispersion of an optical fiber, and is obtained by changing the wave guide dispersion. In short, an refractive index profile adjustment to the core and cladding resulted in shifting the zero dispersion to 1.5 µm.

The optical fiber transmission characteristics can be more improved generally by further reducing chromatic dispersion. Yet, launching WDM signals into an optical fiber with too low chromatic dispersion induces unwanted waves in consequence of Four Wave Mixing (FWM), leading into a fault of the increase in the inter-channel cross talk. This fault was solved by the proposal of Non-Zero Dispersion Shifted Fiber (NZDSF).

One of the research and development tasks for the WDM transmission is to pursue a broader transmission band of wavelength. The main range of operating wavelengths has been made up of the C-band (1530-1565 nm) and the L-band (1565-1625 nm). Recently, a reduced dispersion slope NZ-DSF to cover up-to the S-band (1460-1530 nm) is substantiated and proposed in papers at "ECOC '01 PD A1-5 (2001), OECC '02 11D1-2 (2002)".

However, even a reduced dispersion slope NZ-DSF is subject to limitations on its shorter-wavelength range by the zero dispersion wavelength, and on the longer-wavelength range by the cumulative dispersion. Accordingly, the wavelength band for transmission was limited to around 200 nm. In addition, the zero-dispersion wavelength of the NZ-DSF limits pump light wavelength band for the Raman amplification, almost unworkable in the S-band.

One purpose of the present invention is to provide optical fibers suitable for the WDM transmission in a broad wavelength range between the E-band and U-band, also to allow for Distributed Raman Amplification in the S-band and to provide optical fibers with lowered bending loss and suppressed non-linearity.

SUMMARY OF THE INVENTION

As shown carve "a" in FIG. 26, it is known that four wave mixing (FWM) $F_{1-p}$ arises around signal lights $(S_{1-n})$ in the case a zero-dispersion wavelength of an optical fiber interposes between wavelengths of signal lights $(S_{1-n})$ and pump lights $(R_{1-m})$. In addition, formula $F_{fwm}=f_i+f_j-f_k$ holds, where $F_{fwm}$ denotes a FWM frequency, $f_i$, $f_j$ and $f_k$ denote frequencies of signal lights $(S_{1-n})$ and pump lights $(R_{1-m})$, given $i \neq k$, $i \neq j$.

Also it is known that the intensities of FWM light $F_{1-p}$ are in proportion to the generation efficiency "η" as shown in Formula 1, as published, for instance, in "Lightwave Technology, vol. 8, No. 9, pp. 1402 to 1990 (by Mari W. Maeda J.)".

$$\eta = \frac{\alpha^2}{\alpha^2 + \Delta\beta^2}\left(1 + \frac{4e^{-\infty L}\sin^2\left(\frac{\Delta\beta L}{2}\right)}{(1-e^{-\infty L})^2}\right) \quad (1)$$

where α denotes a transmission loss, L denotes a fiber length, and Δβ denotes a setting for phase-matching in FWM (sec Formula 2).

$$\Delta\beta = \beta_i + \beta_j - \beta_k - \beta_{fwm} \quad (2)$$
$$\cong \frac{\pi\lambda^4}{c^2}Ds\{(f_i-f_0)+(f_j-f_0)\}(f_i-f_k)(f_j-f_k)$$

where β is a propagation constant, c is the light velocity, λ is wavelength, Ds is a dispersion slope in optical fiber, $f_i$, $f_j$ and $f_k$ are frequencies of signal lights $S_{1-n}$ and pumping lights $R_{1-m}$, $f_0$ is a frequency converted from the zero-dispersion wavelength of an optical fiber. Notably, the FWM action prominently emerges in an optical fiber where signal and pumping lights propagate in the same direction. Formula 2 can be approximated in the case of signal and pumping lights propagating in the same direction through optical fiber 8, as shown in the above Formula 2.

According to Formulae 1 and 2, where a zero-dispersion wavelength of optical fiber interposes between signal lights $S_{1-n}$ and pumping lights $R_{1-m}$, the FWM $(F_{1-p})$ generation efficiency between the signal and pumping lights increases.

As described above, where the FWM $F_{1-p}$ occurs to degrade the transmission performance of signal lights $S_{1-n}$, the increased FWM generation efficiency η results in an increase in the intensity of the pumping light absorbed by the FWM, thereby disallowing a large Raman gain for the signal Lights.

In addition, since the FWM generation efficiency between signal lights and pumping lights becomes larger when both the lights propagate in the same direction, making the bi-directional pumping not available, the optimal optical transmission system cannot be built up.

In conclusion, the suppression of the FWM in an optical fiber is one of the significant tasks to realize a WDM Raman transmission system.

For reference, the WDM transmission is implemented, for instance, by using an erbium-doped fiber amplifier mainly in the C band between 1530 nm and 1565 nm, while an expansion of the WDM transmission band to 1530 nm and 1625 nm, notably, in the so called L-band of 1565 nm to 1625 nm, is under study.

A Raman WDM transmission line covering the C and L bands needs pump light at a wavelength around 100 nm shorter than the shortest wavelength of the transmission wavelength band. The FWM in the optical fibers is conceivably suppressed by a zero-dispersion wavelength outside of the range of 1430 nm, 100 nm shorter than 1530 nm, to 1625 nm.

Also, it is earnestly desired to enable WDM transmission in the S band between 1460 nm and 1530 nm, and in order to use the S, C and L bands for the WDM transmission, it is preferable for a zero-dispersion wavelength to be outside of the range of 1360 nm to 1625 nm.

Also, the Raman WDM transmission system requires making optical fiber characteristics or parametric values, namely, dispersion slope, effective area (Aeff), transmission loss, absorption loss caused by hydroxyl ion, polarization mode dispersion (PMD) etc, appropriate, in addition to the above FWM suppression.

For example, a large dispersion slope results in waveform distortion due to dispersion, and a large effective area leads to an insufficient Raman amplification efficiency. Similarly, a high transmission loss limits the transmission in a long distance, and high polarization mode dispersion brings in a long delay between signal lights due to the polarized light direction especially in high-speed transmission, degrading the signal light transmission.

Moreover, absorption loss caused by hydroxyl ions adversely affects broadening the WDM band because of the insufficient Raman amplification efficiency in the case the pump lights wavelength band include 1385 nm or thereabout.

Up to the present, no optical fiber fulfilling the above requirements has been proposed, and no high-quality and broadband Raman amplification system has been built up.

For instance, a conventional single mode optical fiber (SMF) has no zero-dispersion wavelength between 1360 nm and 1625 nm and hence allows for the suppression of the FWM. But, SMFs have relatively low values of $n_2/A_{eff}$ which prevents to create a Raman gain enough to compensate the loss of the transmission line. (Note $n_2$: Karr coefficient and $A_{eff}$: effective area).

For instance, as shown in FIG. 27, the $n_2/A_{eff}$ of $4.4\times 10^{-10}$/W or larger is required to make the fiber loss and Raman gain equal But, SMFs cannot meet this requirement (see the slant-lined zone).

In addition, the SMF has a dispersion of approximately +17 ps/nm/km in a wavelength band of 1.5 μm. As a result, transmission signals at the 1.5 μm band may cause the intra-channel four-wave mixing by pulse broadening due to such large dispersion. Therefore, the SMF is undesirable for a WDM transmission system applying the Raman amplification.

For example, FIG. 28 presents absolute-dispersion value vs. pulse broadening due to dispersion. (Note T: inversion of a bit rate, t: FWM frequency of pulses). With a t/T value of 0.4 or less, the intra-channel four wave mixing can be suppressed.

As described in the above, for transmission systems with 10 Gbps or more, an absolute dispersion of the optical fiber should be 9 ps/nm/km or less. But, the SMF, as shown in the slant-lined range, has a dispersion of approximately 17 ps/nm/km and exceeds a t/T value of 0.4, and therefore is not desirable for an optical transmission line in transmission systems with 10 Gbps or more.

Similarly it is known that, considering the simultaneous transmission of signal light in both the C and L bands, the difference in dispersion between both bands can be retardation for broadening the WDM transmission band, even if the reduced dispersion slope NZ-DSF would be applied. Also, taking into consideration of the advanced development of Raman amplifiers, the NZ-DSF can conceivably be applied to combine the S, C and L-hands for simultaneous signal transmission. Yet, the optical fibers disclosed at "ECOC '01 PD A1-5 (2001)" and "OECC '02 11D1-2 (2002)" involve a zero-dispersion wavelength in the Raman pump lights band for S-band of 1360 nm to 1430 nm, consequently FWM arises to make the Raman amplification unavailable. Their alternative fiber is needed to solve the limitation.

The object of the present invention is to provide an optical fiber with suppressed FWM, lowered dispersion, reduced dispersion slope absolute value, efficient Raman amplification and preferably lowered transmission loss and polarization mode dispersion, suitable for WDM transmission with, the Raman amplification, and optical transmission line and optical transmission system.

In order to attain the above-mentioned purpose, the following optical fibers with the characteristics mentioned therein are proposed.

1) An optical fiber characterized by:
   an absolute value of dispersion of not less than 0.5 ps/nm/km and not more than 9 ps/nm/km over a wavelength range of 1430 nm to 1625 nm,
   an absolute value of dispersion slope of 0.04 ps/nm²/km or less at 1550 nm,
   a mode field diameter (MFD) of 7 μm or smaller at 1550 nm, and
   a cable cutoff wavelength of 1430 nm or shorter.

2) An optical fiber in which the dispersion "D" is not less than 2 ps/nm/km and not more than 8 ps/nm/km: ($2 \leq D \leq 8$ ps/nm/km) over a wavelength range of 1400 to 1700 nm, and at least one extreme value of dispersion within said wavelength range.

3) An optical fiber having
   a dispersion of 4 ps/nm/km or more r at 1550 nm,
   a positive dispersion slope of not more than 0.050 ps/nm²/km at least at a predetermined wavelength within a range of 1460 nm to 1625 nm,
   a cable cutoff wavelength of 1550 nm or shorter at a length of 2 m,
   a zero-dispersion wavelength of 1460 nm or shorter, and
   a transmission loss of 1.5 dB/km or lower at 1385 nm.

BRIEF DESCRIPTION OF THE DRAWINGS

FIG. 2 shows a sample correlation in wavelength of pumping lights and signal lights, along with a zero-dispersion wavelength in the first embodiment according to the present invention.

FIG. 19 draws wavelength dependence of transmission loss against difference of transmission loss at 1385 nm in the fourth embodiment according to the present invention.

DESCRIPTION OF THE PREFERRED EMBODIMENTS

Hereinafter, the preferred embodiments of this invention are described with reference to the drawings.

Embodiment 1

Figure 1A:
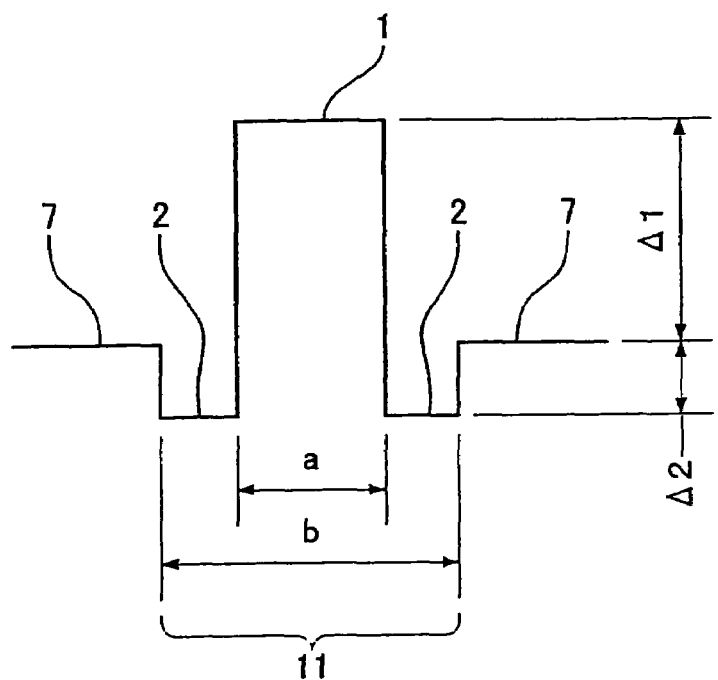
FIG. 1 shows a refractive index profile, FIG. 1(a), and a cross-section, FIG. 1(b), of an optical fiber according to the first embodiment of the present invention.
Figure 1B:
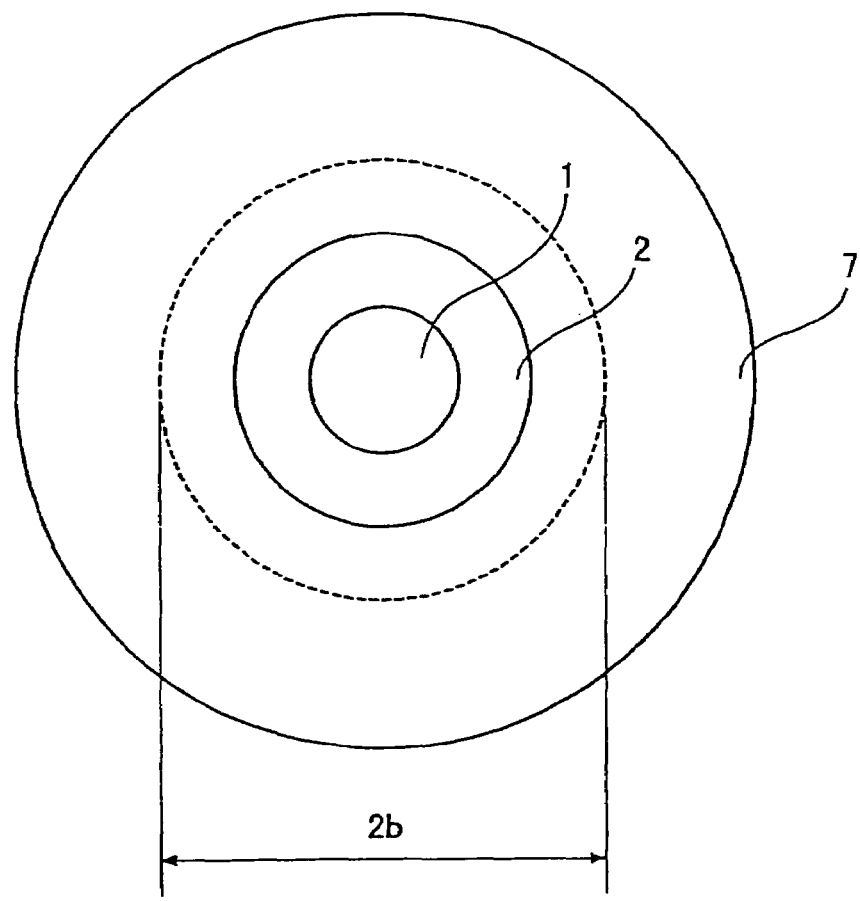

FIG. 1(a) shows a refractive index profile and FIG. 1(b) shows a cross-section of an optical fiber according to the first embodiment of the present invention. The refractive index profile in FIG. 1(a) features to be relatively simple and easy to design and control, compared to the other profiles.

Optical fiber of the first embodiment comprises of a core 11 at the center and a cladding 7 surrounding the core 11. In addition, the core has at least two layers with a first layer 1 at the center and a second layer 2 surrounding the first layer 1; the first layer 1 has a relative refractive index difference Δ1 of not less than 0.6% and not more than 1.6% with the cladding 7; the second layer has a relative refractive index difference Δ2 of negative value with the cladding 7; a diameter of the first layer 1 is shown as "a" and a diameter of the second layer 2 is shown as "b".

The present, patent specification defines the above relative refractive index differences (Δ1, Δ2, Δn) in the following approximation formulas (Formula 3, Formula 4, Formula 5):

$$\Delta 1(\%) = \{(n_1^2 - n_c^2)/2 \cdot n_c^2\} \cdot 100 \quad (3)$$

$$\Delta 2(\%) = \{(n_2^2 - n_c^2)/2 \cdot n_c^2\} \cdot 100 \quad (4)$$

$$\Delta n(\%) = \{(n_n^2 - n_c^2)/2 \cdot n_c^2\} \cdot 100 \quad (5)$$

($n_1$: refractive index of first layer, $n_2$: refractive index of second layer $n_n$: refractive index of nth layer, $n_c$: refractive index of cladding)

Table 1 presents trial optical fibers #1-1 to #1-14 in the first embodiment with parametric values and performance characteristics, including relative refractive index differences for Δ1 and Δ2, in the unit of %. In addition, Δ1 (Ge) and Δ1 (F) show contributions of doped Germanium and Fluorine, respectively.

second layer at least with fluorine. The trial optical fibers #1-12 to #1-14 in Table 1 were fabricated according to this example of composition, notably, their first and second layers were doped with substantially the same amounts of fluorine.

All optical fibers of the first embodiment made a transmission loss of 0.25 dB or less at 1550 nm.

Considering a long distance, e.g., 80 km of transmission line, the transmission loss requires to be 0.25 dB/km or less, if a total loss of 20 dB or less is targeted. The Raman amplification can offset a certain loss increase, but it is necessary to make the loss 0.25 dB/km or less in a signal light band, if generating of noise etc. is taken into consideration.

Thus, an optical fiber of the first embodiment, which made a transmission loss of 0.25 dB/km, or less at 1550 nm, is suitable for long distance transmission in a 1.55 μm band, as described above.

An optical fiber of the first embodiment made a transmission loss of 1.0 dB/km or less at 1385 nm.

As generally known, the optical fiber has absorption loss arising from hydroxyl ion at 1385 nm or thereabout, which will not relatively affect the C-band operation, but may adversely affect the S-band operation.

That is, when applying an optical fiber to the optical transmission line for the Raman amplification in the S band, absorption loss result in loss of the pump light since both wavelength bands overlap around the wavelength of 1385 nm.

Optical fibers with a loss of over 1 dB/km at 1385 nm cause large pump light loss and require an expensive light source and large electric power, and consequently result in a problem in cost.

An optical fiber of the first embodiment, which made a transmission loss of 1.0 dB/km or less at 1385 nm, can suppress the pump light loss in an optical transmission line equipped with Raman amplifiers in the S-band.

TABLE 1

| | Δ1 (Ge) % | Δ1 (F) % | Δ1 Total % | Δ2% | a μm | b μm | Dispersion ps/km/nm | | | Dispersion slope ps/km/nm 1560 nm | Transmission loss dB/km | | | MFD μm | PMD ps/√km | n2/Aeff 10⁻¹⁰/w | Bending loss dB/m 1550 nm | cutoff wavelength nm |
|---|---|---|---|---|---|---|---|---|---|---|---|---|---|---|---|---|---|---|
| | | | | | | | 1960 nm | 1430 nm | 1625 nm | | 1390 nm | 1550 nm | 1560 nm | | | | | |
| #1-1 | 0.60 | — | 0.60 | −0.45 | 6.1 | 14.1 | 0.51 | 4.13 | 6.92 | 0.009 | 0.612 | 0.202 | 6.3 | 0.19 | 8.6 | 4.8 | 890 |
| #1-2 | 0.60 | — | 0.60 | −0.30 | 6.4 | 13.9 | −0.17 | 2.79 | 8.57 | 0.026 | 0.651 | 0.206 | 6.79 | 0.08 | 7.4 | 3.7 | 916 |
| #1-3 | 0.70 | — | 0.70 | −0.80 | 4.9 | 15.8 | −3.04 | 0.88 | 7.96 | 0.033 | 0.668 | 0.208 | 6.08 | 0.11 | 9.9 | 2.2 | 935 |
| #1-4 | 0.70 | — | 0.70 | −0.40 | 5.7 | 11.9 | −0.52 | 3.05 | 8.29 | 0.023 | 0.664 | 0.211 | 6.11 | 0.15 | 9.8 | 1.1 | 982 |
| #1-5 | 0.70 | — | 0.70 | −0.40 | 5.2 | 12.1 | −5.46 | −3.01 | −5.89 | −0.002 | 0.697 | 0.207 | 5.99 | 0.13 | 10.1 | 4.3 | 870 |
| #1-6 | 0.90 | — | 0.90 | −0.40 | 4.4 | 11.7 | −8.78 | −6.10 | −5.74 | −0.003 | 0.717 | 0.222 | 5.40 | 0.42 | 14.0 | 1.6 | 896 |
| #1-7 | 1.00 | — | 1.00 | −0.40 | 4.4 | 11.8 | −8.90 | −6.03 | −3.38 | 0.009 | 0.728 | 0.234 | 5.19 | 0.35 | 16.0 | 0.7 | 926 |
| #1-8 | 0.80 | — | 0.80 | −0.40 | 4.9 | 11.9 | −5.98 | −3.20 | −2.37 | −0.001 | 0.674 | 0.211 | 5.68 | 0.04 | 12.0 | 3.2 | 820 |
| #1-9 | 1.20 | — | 1.20 | −0.55 | 6.0 | 12.4 | −3.31 | 0.59 | 7.53 | 0.032 | 0.810 | 0.235 | 4.90 | 0.03 | 19.8 | 0.6 | 1010 |
| #1-10 | 1.40 | — | 1.40 | −0.55 | 4.6 | 10.9 | −2.42 | 1.31 | 7.89 | 0.030 | 0.880 | 0.242 | 4.60 | 0.15 | 24.5 | 0.2 | 1118 |
| #1-11 | 1.60 | — | 1.60 | −0.65 | 4.7 | 11.1 | −2.79 | 1.11 | 8.32 | 0.034 | 0.950 | 0.247 | 4.43 | 0.18 | 28.7 | 0.1 | 1166 |
| #1-12 | 1.10 | −0.40 | 0.70 | −0.40 | 5.8 | 11.9 | −0.60 | 3.12 | 8.43 | 0.024 | 0.490 | 0.212 | 6.01 | 0.19 | 12.5 | 0.9 | 996 |
| #1-13 | 1.05 | −0.45 | 0.60 | −0.45 | 6.0 | 14.0 | 0.52 | 4.14 | 7.06 | 0.009 | 0.480 | 0.215 | 6.27 | 0.22 | 11.2 | 4.7 | 902 |
| #1-14 | 1.05 | −0.45 | 0.60 | −0.45 | 6.1 | 14.1 | 0.53 | 4.08 | 7.11 | 0.009 | 0.450 | 0.216 | 6.29 | 0.18 | 11.2 | 4.9 | 889 |

In addition, "a" and "b" in Table 1 denote a diameter of the first layer and a diameter of the second layer, respectively, and each "dispersion" refers to the values at the wavelength underneath MFD refers to the mode field diameter at 1550 nm; PMD represents polarization mode dispersion at 1550 nm; "bending loss" refers to the values in a bending diameter of 20 mm at 1550 nm "cutoff wavelength" refers to the cable cutoff wavelength, namely the cutoff wavelength at a fiber length of 22 m.

The first embodiment apply silica as the host glass to produce optical fibers; consequently, silica glass forms those optical fibers. An optical fiber of the embodiment has its first layer doped at least with germanium and the second layer at least with fluorine. The trial optical fibers #1-1 to #1-11 in Table 1 were fabricated according to this example of composition.

Meanwhile, another optical fiber of the embodiment has its first layer doped at least with germanium and fluorine, and the An optical fiber of the embodiment made a loss increase of 10% or less at 1385 nm under a hydrogen atmosphere; here, hydrogen examination conditions follow IEC60793-2 Amendment 1,2001-08 Annex B. In this specification, the loss increase under hydrogen atmosphere is defined as mentioned in the above.

Conventionally, a transmission system fails by a loss increase of 10% or more at 1385 nm due to the hydrogen generation in an optical fiber cable unless the input power is not increased.

Since an optical fiber of the first embodiment made loss increase of 10% or less at 1385 nm under a hydrogen atmosphere, it can avoid this problem.

All the trial optical fibers #1-1 to #1-14 have a polarization, mode dispersion (PMD) of 0.5 ps/√km or less at 1550 nm, each.

As generally known, the polarization mode dispersion is one of the limitations to prevent high speed transmission and needs to be not more than 0.5 ps/√km. Otherwise, high speed transmission is impossible without compensating the polarization mode dispersion.

All optical fibers of the first embodiment, made not more than 0.5 ps/√km in polarization-mode dispersion as described, are enabled to perform in high speed transmission, without compensating the polarization mode dispersion.

In particular, trial optical fibers #1-1 to #1-5, #1-8 to #1-12 and #1-14 in Table 1, in which each made a polarization mode dispersion of not more than 0.2 ps/√km, can suppress the undesirable effect of polarization mode dispersion even more, and can perform in high speed transmission at some 40 GB/s, even without compensating the polarization mode dispersion.

Also, trial optical fibers #1-1, #1-13, and #1-14 in Table 1 have a positive dispersion throughout a wavelength band of 1360 nm to 1625 nm, an absolute value of chromatic dispersion of not less than 0.5 ps/nm/km and not more than 9 ps/nm/km, and non zero dispersion wavelength throughout said wavelength band.

Figure 2A:
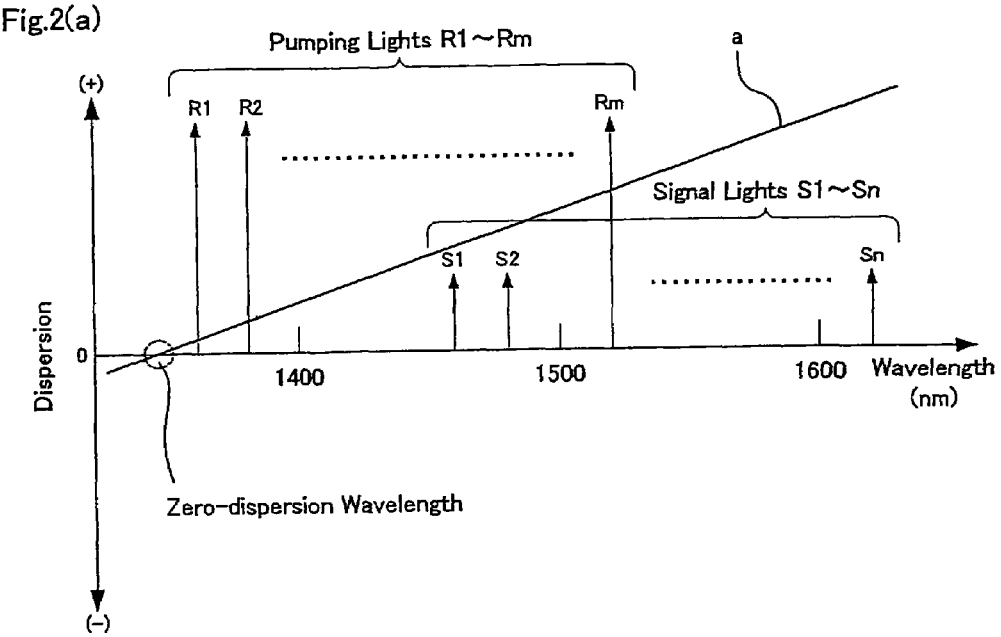
FIG. 2(a) shows a sample correlation in the case of a zero-dispersion wavelength being 1360 nm or shorter and FIG. 2(b) shows a sample correlation in the case of a zero-dispersion wavelength being 1430 nm or shorter.

In short, these trial optical fibers have a zero dispersion wavelength shorter than the shortest wavelength $R_1$ (here 1360 nm) of the pump light $R_{1-m}$ as shown in FIG. 2(a).

Also, trial optical fibers #1-5 to #1-8 in Table 1 have a negative dispersion throughout a wavelength band of 1360 nm to 1625 nm, an absolute value of chromatic dispersion of not less than 0.5 ps/nm/km and not more than 9 ps/nm/km, and non zero dispersion wavelength throughout said wavelength band.

Figure 3:
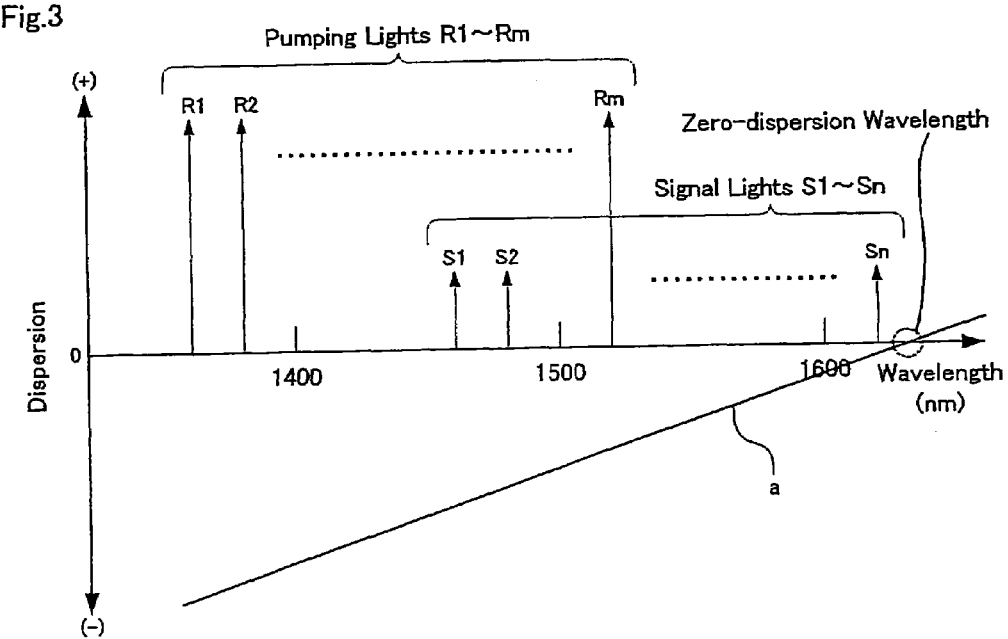
FIG. 3 shows a sample correlation in wavelength of pumping lights and signal lights, along with a zero-dispersion wavelength in the case of a zero-dispersion wavelength being 1625 nm or longer, in the first embodiment according to the present invention.

In short, these trial optical fibers have a zero dispersion wavelength longer than the longest wavelength $R_n$ (here 1625 nm) of the signal light $R_1$ to $R_m$ as shown in FIG. 3.

Figure 4:
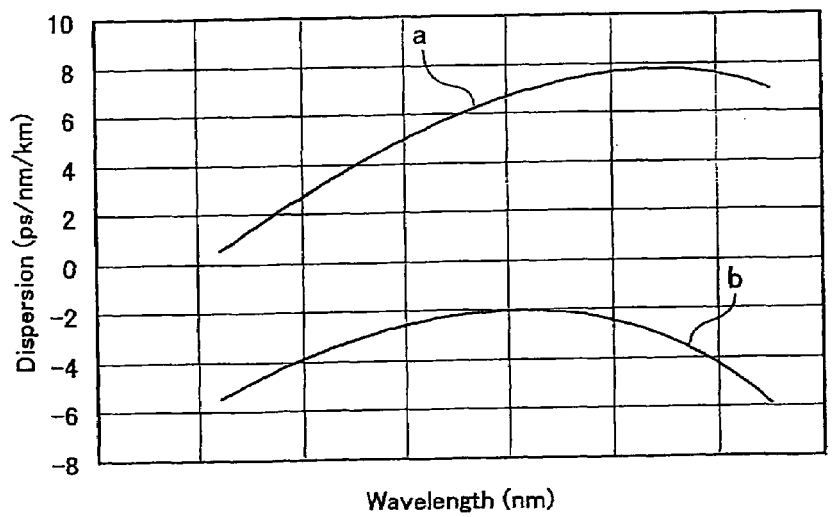
FIG. 4 draws wavelength characteristics of the chromatic dispersion for optical fibers in the first embodiment according to the present invention.

As an example of representation of these optical fibers, the wavelength characteristics of the chromatic dispersion of the optical fibers of #1-1 and #1-5 are shown in FIG. 4. The characteristic line "a" shows the wavelength characteristics of the chromatic dispersion of above-mentioned #1-1, and the characteristic line "b" shows the wavelength characteristics of the chromatic dispersion of above-mentioned #1-5.

As these fibers have a zero-dispersion wavelength over the range of 1360 nm to 1625 nm, FWM generation can be suppressed throughout a broad wavelength band, from S-band to L-band (1460 nm to 1625 nm), and thereby WDM transmission with the Raman amplification can be performed efficiently.

Also, trial optical fibers #1-2 to #1-4 and #1-9 to #1-12 in Table 1 have an absolute value of chromatic dispersion of not less than 0.5 ps/nm/km and not more than 9 ps/nm/km, and non zero dispersion wavelength throughout a wavelength band of 1430 nm to 1625 nm.

Figure 2B:
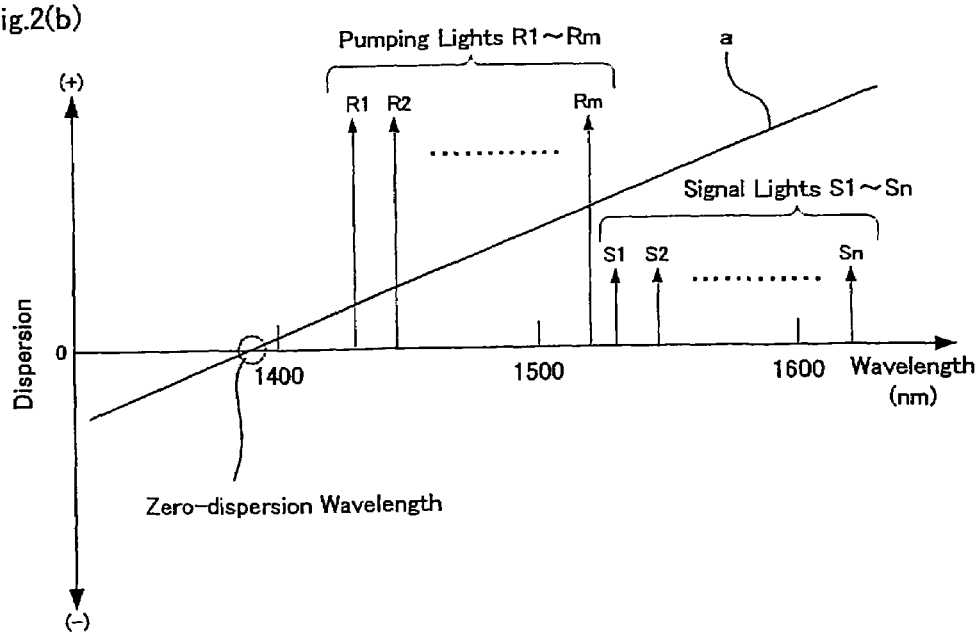

In short, these trial optical fibers have a zero dispersion wavelength shorter than the shortest wavelength $R_1$ (here 1430 nm) of the pump lights $R_1$ to $R_m$ as shown in FIG. 2(b).

In short, in these fibers, FWM generation can be suppressed throughout a broad wavelength band, from C-band to L-band, and thereby WDM transmission with the Raman amplification can be performed efficiently.

All optical fibers of the first embodiment have an absolute value of dispersion of 9 ps/nm/km or less throughout a wavelength band of 1360 nm to 1625 nm, thereby suppressing pulse broadening, and reducing intra-signal non-linear effect.

In a high speed WDM transmission at 40 Gb/s which is applied to the Raman amplification, a cumulative dispersion of 60 ps/nm or more causes significant, waveform distortion, and makes dispersion compensation a necessity, even if each optical fiber in the transmission line does not have so large chromatic dispersion.

Broad band transmission is preferably designed so that the dispersion in the broad band can be compensated with a single dispersion compensator. But, even the dispersion compensating fibers, with an advantage of broad band application, can hardly have a large dispersion slope, and therefore it is difficult to reduce the dispersion to dispersion slope ratio (DPS: dispersion/dispersion slope) to 200 nm or less.

Therefore, in the case of an optical fiber having an absolute value of dispersion of 8 to 9 ps/nm/km to be used in a transmission line, for instance, it is desired to have an absolute value of dispersion slope of 0.04 ps/nm²/km and the same sign as the dispersion. In addition, in the case of an optical fiber having an absolute value of dispersion of 4 to 6 ps/nm/km to be used in a transmission line, it is desired to have an absolute value of dispersion slope of 0.03 ps/nm²/km and the same sign as the dispersion.

All optical fibers of the first embodiment, have an absolute value of dispersion slope of 0.04 ps/nm²/km or less, at 1550 nm, and satisfy the above requirements. As a result, dispersion changes can be suppressed in these fibers, and thereby can make dispersion compensations easy.

The effective area (Aeff) and the mode field diameter (MFD) are corresponding to each other in a unique theorem. An extremely large effective area results in an insufficient Raman amplification efficiency. For reference, the dispersion shifted fiber (DSF) in ITU-T recommendation G.653 has a mode field diameter of 7.8 to 8.5 μm, which, corresponds to a minimum effective area of around 48 μm².

A Raman-amplification gain in stark contrast with that with the referenced DSF can preferably be realized with an effective area of 40 μm² or less (corresponding to 7 μm or less in mode field diameter).

All optical fibers of the first embodiment, having a mode field diameter of 7 μm or less at 1550 nm, can be more suitable for the efficient Raman amplification, than the referenced DSF, thereby enabling desirable WDM transmission.

Also all optical fibers of the first embodiment, having a cable cutoff wavelength of 1360 nm as described above, can satisfy the requirement of the single-mode propagation for pumping lights and signal lights.

Furthermore, all the trials are with a bending loss of 5 dB/m in a bending diameter of 20 mm, at 1550 nm, and therefore as generally known, can realize optical fiber cables for use with low transmission loss over a broad wavelength band of the S-band to the L-band.

The present inventor has made various studies to formulate refractive index profiles for the optical fibers of the embodiment. As a result, it turns out that a negative value for relative refractive index difference Δ2 will lead up to a rather reduced absolute value of dispersion slope in an optical fiber, as shown in FIG. 1.

As for relative refractive index difference Δ1, a relative refractive index difference of less than 0.6% makes the mode field diameter of 7 μm or less at 1550 mm and a relative refractive index difference of more than 1.6% makes the transmission loss of 0.25 dB/km or more at 1550 nm.

According to the above, trial optical fibers were fabricated (see Table 1, for example), with their profiles formulated, targeting on a relative refractive index difference Δ1 of not less than 0.6% and not more than 1.6%, and a relative refractive index difference Δ2 of negative value.

The present inventor has made various studies of manufacturing method of optical fibers, and decided the following methods as preferable manufacturing methods for an optical fiber according to the first embodiment:

The first method is characterized that the first layer 1 and the second layer 2 of the core are formed in one process. The second method is characterized that the cladding region whose diameter is more than two times that of the second layer of the core, see FIG. 1(*b*); Zone CL as broken-lined, is formed in the same process along with the first layer 1 and the second layer 2.

Preferable methods are applied to trials #1-13 and #1-14 in Table 1. Trial 13 is manufactured with the first method, and trial 14 with the second.

All optical fibers according to the first embodiment have the same refractive index profile as shown FIG. 1. Yet notably, trial #1-1 had its first layer and second layer formed in two different processes. Trial #1-13 had its first and second layers formed in one process. In trial #1-14, the first and second layers and a cladding region, whose diameter is more than two times that of said second layer 2, were formed in one process.

The method for trials #1-13 and #1-14 create no boundary faces between layers in cores, whereby the loss due to hydroxyl ion can be suppressed; the transmission loss at 1385 nm can be reduced. For information, the transmission loss at 1385 nm of trial #1-1 can seldom cause any problem. However, it is desirable to target oh those values obtained in trials #1-13 and #114.

In addition, the transmission loss at 1385 nm of trial optical fiber #1-14 is even less, because the first and second layers and a part of the cladding were formed in the same process.

Moreover, optical fibers of trial #1-1 and trial #1-14 have the same mode field diameter, but differ in $n_2/A_{eff}$. Optical fiber of Trial #1-14 had its first layer doped with both germanium and fluorine, and a greater doping concentration and a larger $n_2$ value than in trial #1-1, of which first layer has the same refractive index. As a result, trial #1-14 can have an $n_2/A_{eff}$ value larger than trial 1, creating a greater Raman gain.

Now, an explanation about a first example of an optical transmission line according to the first embodiment is given. The first example transmission line involved trial optical fibers #1-1 and #1-7 as connected in series. Trial fiber #1-1 was positioned at the transmitter side and trial #1-7 at the receiver side. The ratio of lengths of #1-1 to #1-7 was 1.6:1.

From the aspect of cumulative dispersion, at least one optical fiber with positive dispersion and at least one optical fiber with negative dispersion are preferably applied to form an optical transmission line; this intention is reflected in the first example.

Figure 5:
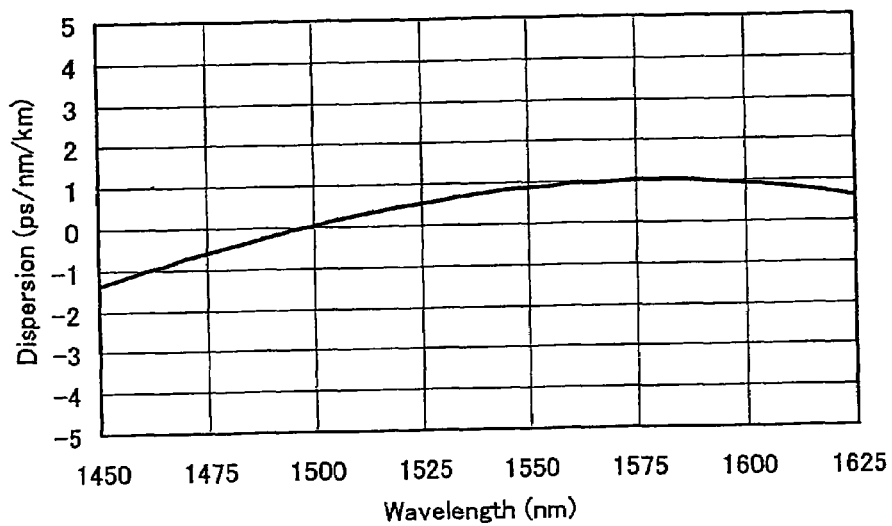
FIG. 5 draws a wavelength characteristic of the chromatic dispersion for an optical transmission line in the first example of the first embodiment, according to the present invention.

FIG. 5 shows the average dispersion curve for the optical transmission. Notably, the average dispersion over an optical transmission fine can never affect the pump light, and should be discussed with reference to the transmission wavelength band between 1460 and 1625 nm, where the average dispersion is substantially zero over the wavelength band as shown in FIG. 5.

In the first example optical transmission line, the average dispersion in a predetermined wavelength within a wavelength band of 1460 to 1620 nm (here throughout the band) is adjusted to not less than –1.0 ps/nm/km and not more than 1.0 ps/nm/km. The average dispersion is –1 ps/nmkm at 1460 nm and remains less than +1 ps/nmkm up to 1625 nm.

The first example optical transmission line with an absolute value of dispersion of 1 ps/nm/km or less over the S, C and L-bands, realizes WDM transmission and thereby there is suppressed waveform distortion due to dispersion in all the above bands.

Therefore, the transmission line can be applied to form an optical transmission system with an average dispersion of not less than –1.0 ps/nm/km and not more than +1.0 ps/nm/km in a predetermined wavelength within a range of 1460 nm to 1625 nm (here throughout the range).

Figure 23:
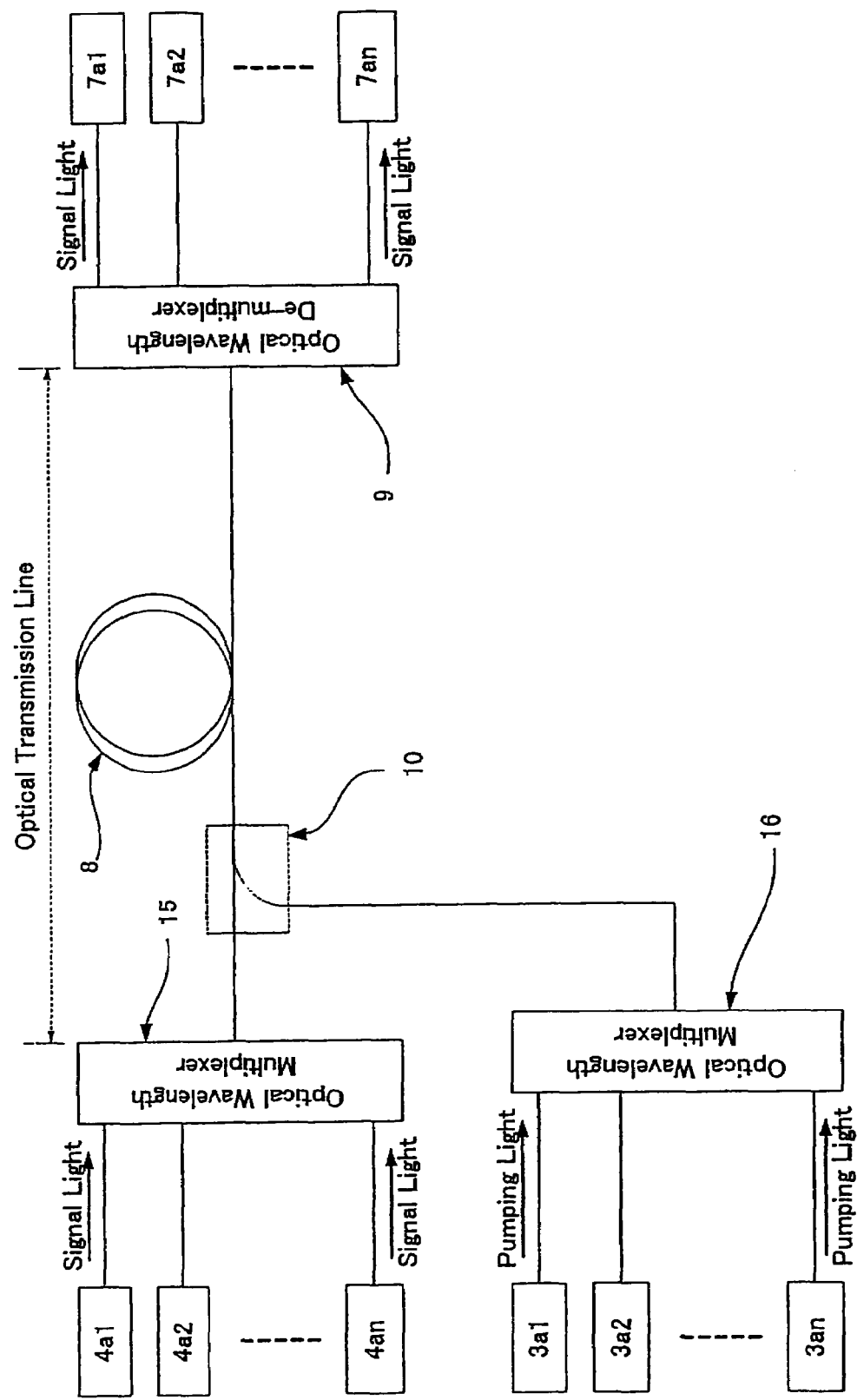
FIG. 23 is a diagram for an example co-pumping Raman amplification WDM transmission system.
Figure 24:
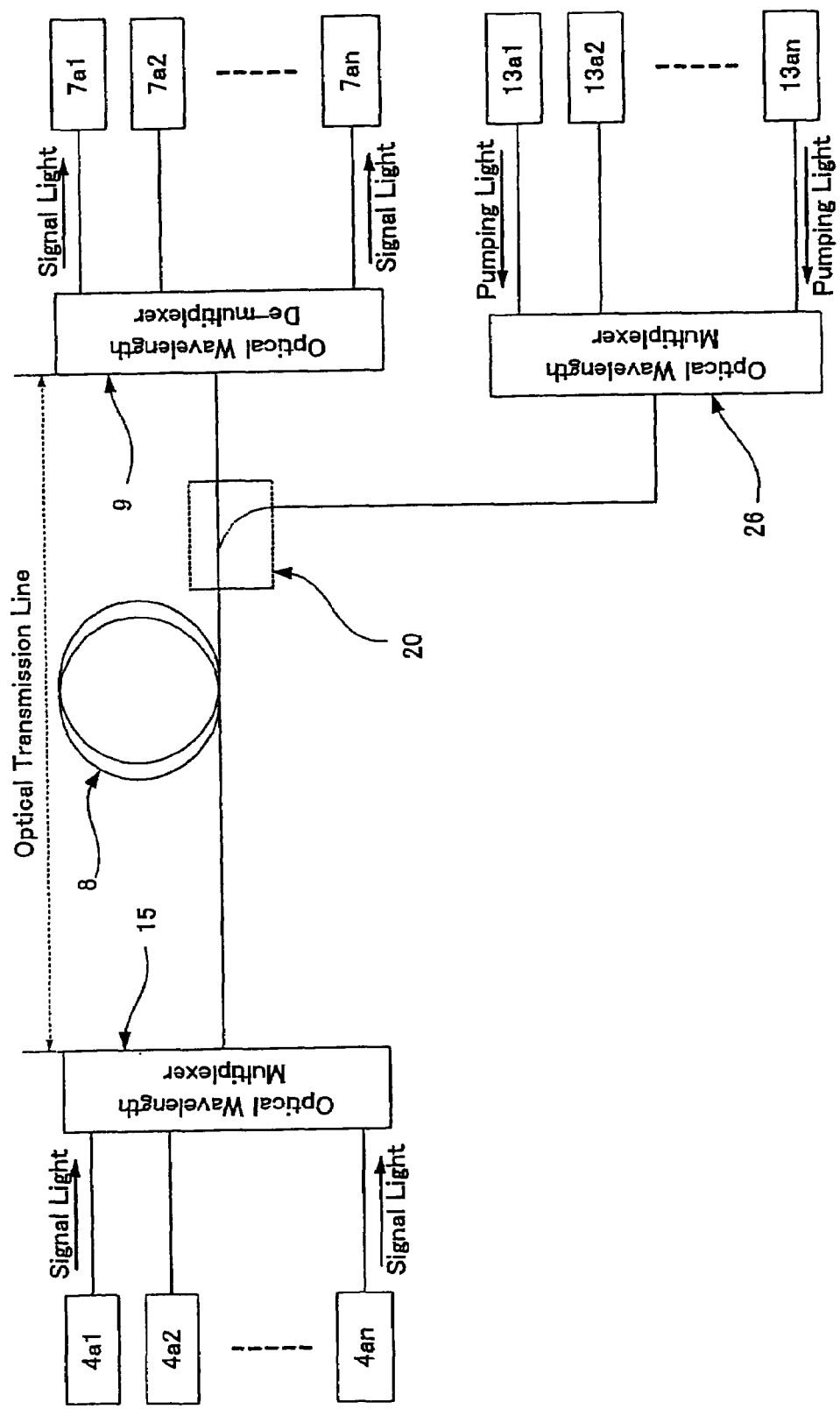
FIG. 24 is a diagram for an example counter-pumping Raman amplification WDM transmission system.
Figure 25:
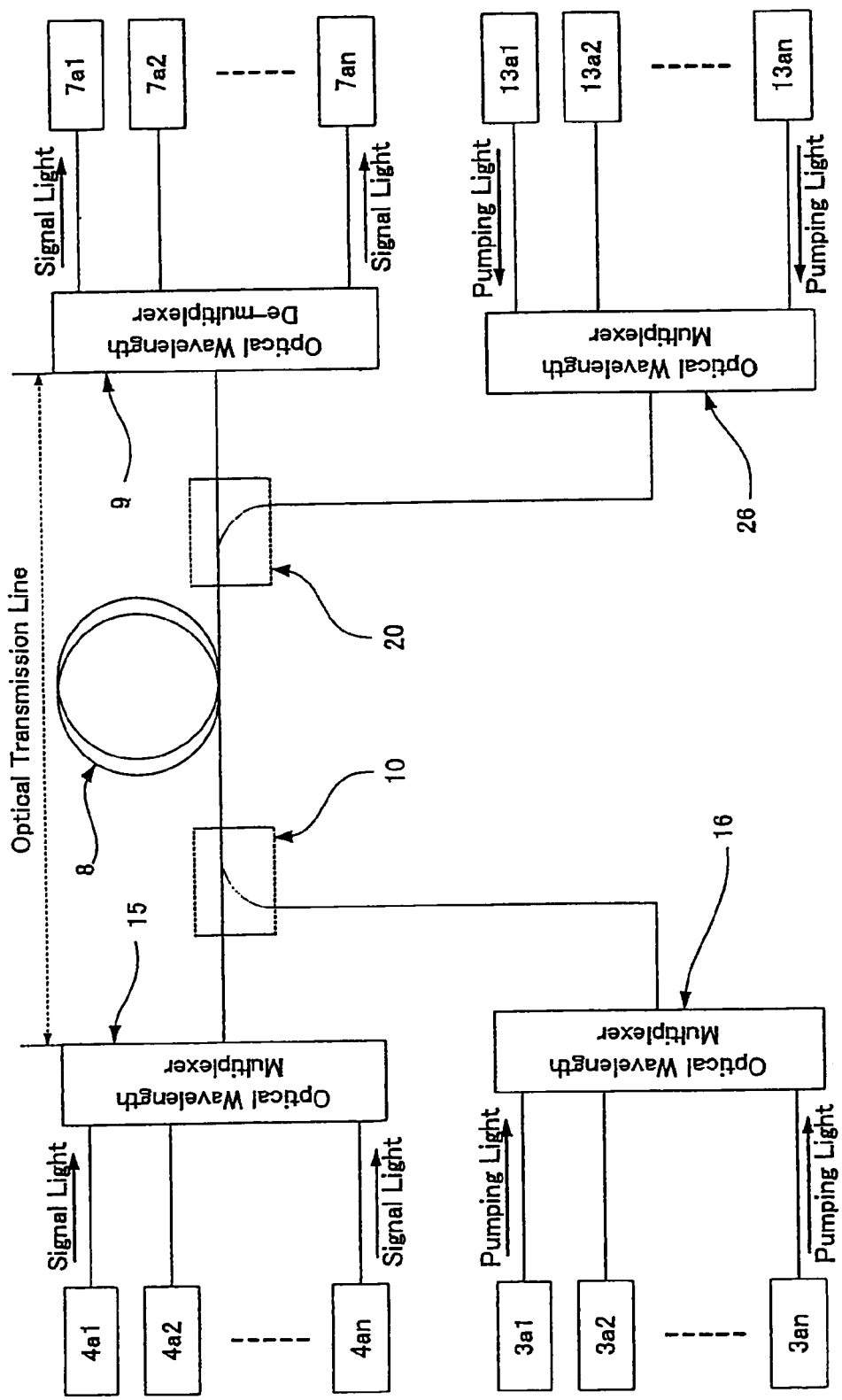
FIG. 25 is a diagram for an example bi-directional pumping Raman amplification WDM transmission system.
Figure 26:
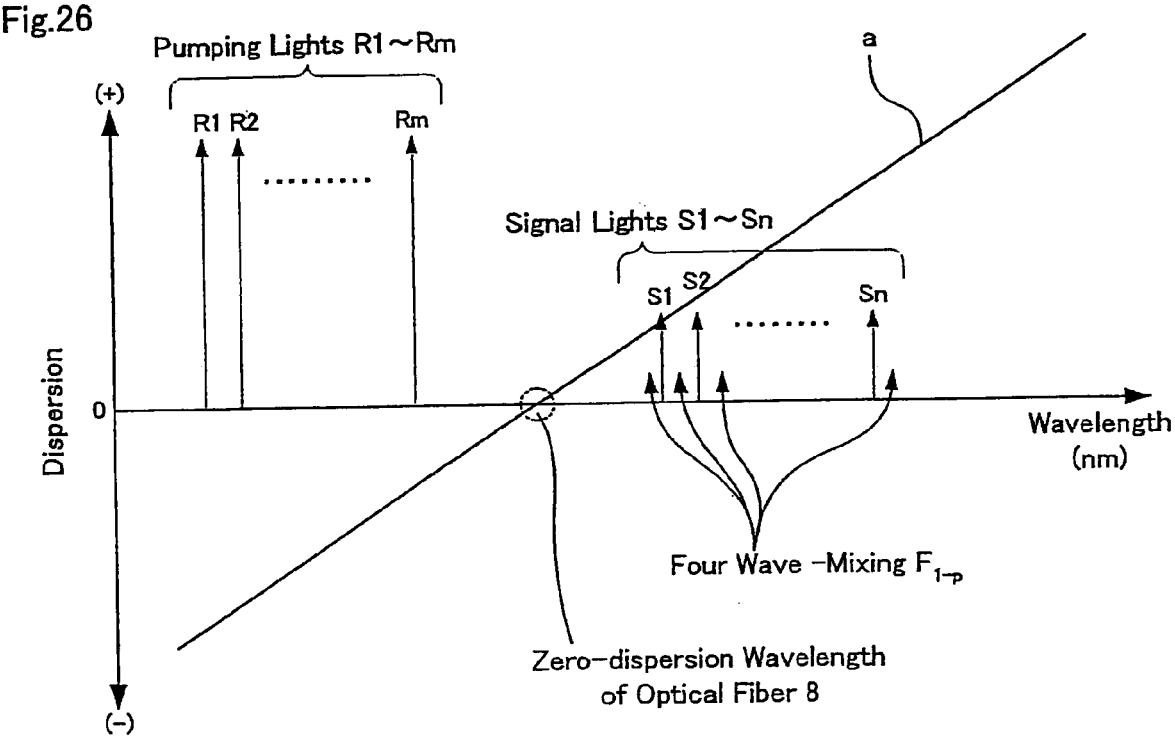
FIG. 26 shows a conventional sample correlation in wavelength of pumping lights and signal lights, along with a zero-dispersion wavelength.
Figure 27:
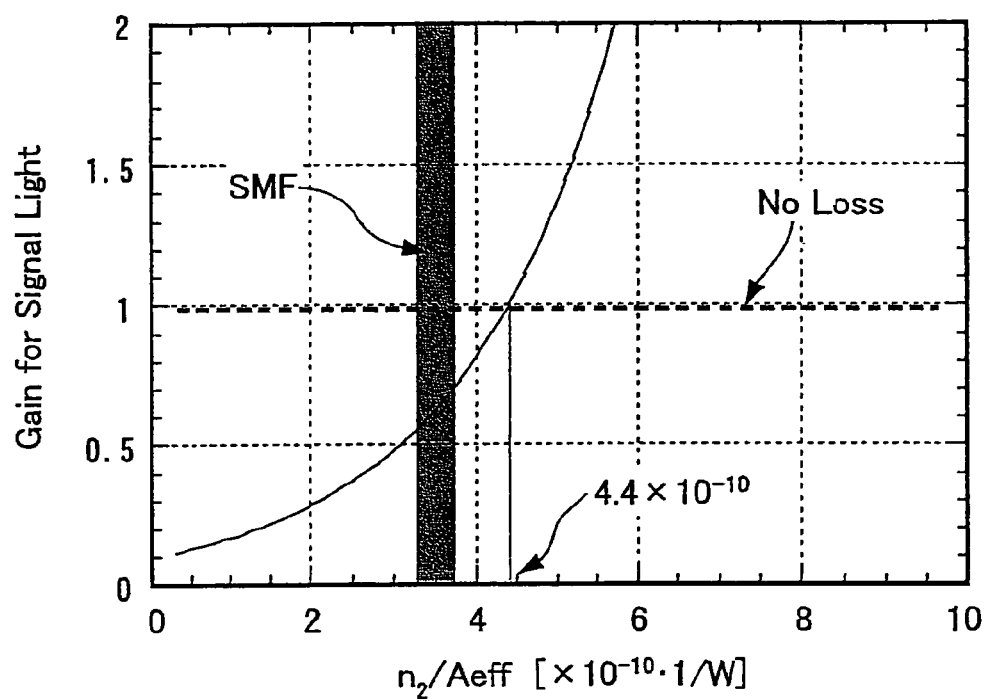
FIG. 27 draws input/output signal intensity vs. $n_2/A_{\mathit{eff}}$ for an optical fiber.
Figure 28:
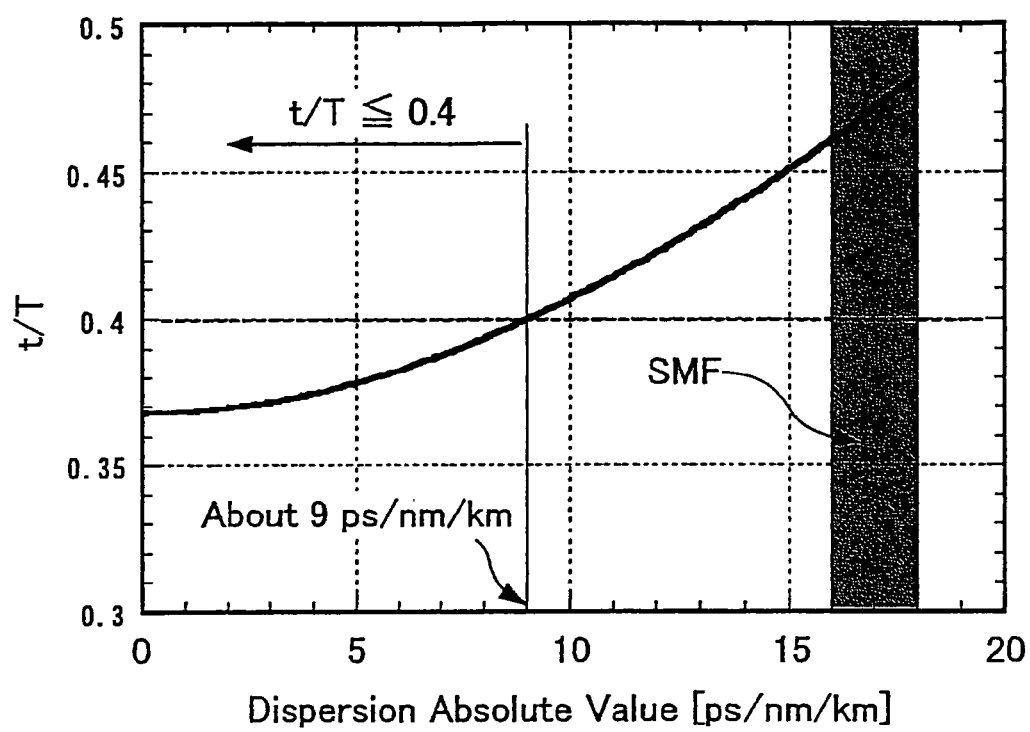
FIG. 28 draws pulse spread vs. chromatic dispersion (absolute value).

The optical transmission system is connected to an optical transmission line with signal light sources and pump light sources which have different wavelengths from the signal lights, and applicable for co-propagation pumping, counter propagation pumping and bi-directional propagation pumping system, shown as FIGS. 23 to 25, for example.

Here, the determined wavelength band may be only the operating wavelength band, unlike the example as shown. Thus, a partial or whole operating wavelength band can be made to have a dispersion in absolute value of 1 ps/nmkm or less, by a design to form an optical transmission line.

For applying the Raman amplification of the counter propagation pumping system to the dispersion managed transmission line, optical fiber having a less Raman gain should not be positioned to the receiver side to acquire the required Raman gain. Accordingly, among the optical fibers to be laid out, optical fiber having the largest mode-field diameter should not be positioned next to the receiver side.

Figure 6:
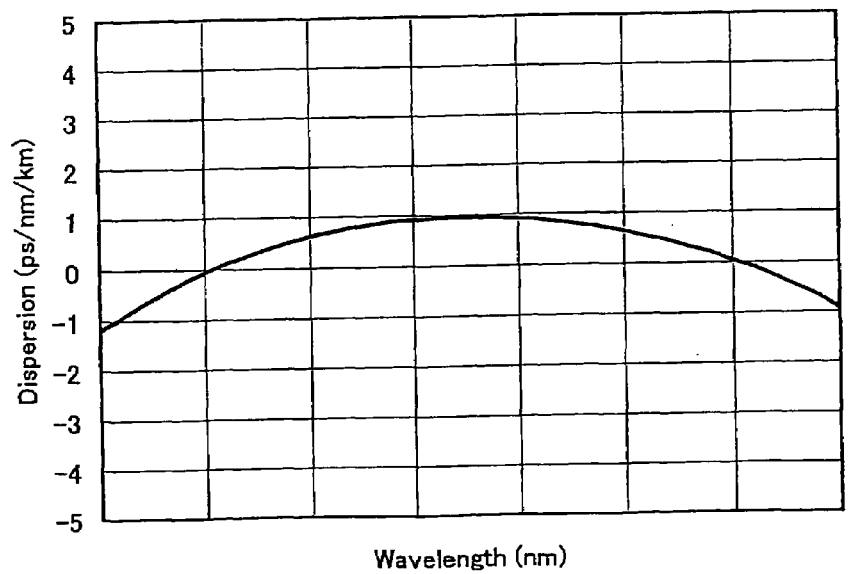
FIG. 6 draws a wavelength characteristic of the chromatic dispersion for an optical transmission line in the second example of the first embodiment, according to the present invention.

FIG. 6 shows the average dispersion for an optical transmission line in the second example. The transmission line comprises of trial optical fiber #1-1 and a dispersion compensating fiber of single-mode fiber, at a ratio of lengths of 12:1.

The dispersion compensating fiber for the optical transmission line in the second example has a dispersion of –72 ps/nm/km at 1460 nm, –80 ps/nm/km at 1550 nm and –94 ps/nm/km at 1625 nm.

An optical transmission line in the second example made an average dispersion of not less than –1.0 ps/nm/km and not more than 1.0 ps/nm/km in a predetermined wavelength within a range of 1460 nm to 1625 nm (here throughout the range), and has the same effect as the one in the above example. Similarly, ah optical transmission system with an optical transmission line connected to the second example can also have the same effect as the one connected to an optical transmission line in the above first example.

For reference the optical transmission line in the second example had +0.96 ps/nm/km of maximum dispersion at 1540 nm and –0.92 ps/nm/km of minimum dispersion at 1625 nm.

Moreover, optical fibers for the transmission lines according to the first embodiment are not limited to the first and second example. That is, for instance, optical fibers according to the first embodiment may have the refractive index profiles other than the above mentioned, and also the transmission line can involve at least one optical fiber with positive dispersion connected with at least one optical fiber with negative dispersion, depending upon the requirement.

The first embodiment allows a resultant optical transmission system with an average dispersion of not less than –1.0 ps/nm/km and not more than 1.0 ps/nm/km in a predetermined wavelength band of 1460 to 1625 nm, where the band may be partial or throughout between both wavelengths.

In addition to the above case with an optical fiber and an optical transmission system connected to a Raman amplified WDM transmission system, an optical fiber and an optical transmission system according to the first embodiment can be applicable for a WDM transmission system with other than Raman amplifier, for instance, one with EDFA (Erbium Doped Fiber Amplifier).

Embodiment 2

An optical fiber in a second embodiment has a zero dispersion wavelength of 1350 nm or shorter, and makes it possible to suppress the FWM and the cumulative dispersion over a broad wavelength band of 1400 to 1700 nm. The conventional reduced dispersion slope NZ-DSF proposed until now makes it possible to realize a signal transmission over the S, C and L-bands (1460-1625 nm). The optical fiber according to the second embodiment has a dispersion "D" of not less than 2 and not more than 8 ps/nm/km ($2 \leq D \leq 8$ ps/nm/km) even in the longer wavelengths of U-band (1625-1675 nm) and the shorter wavelengths of the E-band (1365-1700 nm), along with the referenced three bands, suppressing the FWM generation and the cumulative dispersion.

In the case when optical fibers in the second embodiment are applied to a transmission line, a distributed Raman amplifier, and a discrete Raman amplifier applied to at least one of the S, C and L-bands, can be combined to compensate the transmission loss over those bands (1460-1625 nm). As the dispersion slope of the optical fiber is made to zero, the zero dispersion wavelength can be shifted to the shorter wavelength side (shorter than 1360 mm preferably 1340 nm) than in the reduced dispersion slope NZ-DSF, and thereby the FWM generation can be suppressed even in the Raman amplification wavelength band for transmission signals in the S-band.

In addition, in the case when EDFA (Erbium Doped Fiber Amplifier), TDFA (Thulium Doped Fiber Amplifier), and a discrete Raman amplifier are simultaneously used, an effective area ($A_{eff}$) of not less than 40 μm² (preferably not less than 45 μm²) at 1550 nm is made, considering the suppression of the non-linear effect. Single mode propagation at least in the C-band was ensured by adopting a cable cutoff wavelength of 1550 nm or shorter. A bending loss in a bending diameter of 20 mm is made to be 5 dB/m or less.

An optical transmission system is built up, by comprising an S-band distributed Raman amplifier and the optical fibers having the above dispersion as an optical transmission line. The optical transmission system provides a high-quality WDM transmission. The optical fiber is especially suitable for relatively short distance transmission such as metropolitan network systems.

Hereinafter, the second embodiment of this invention is described with reference to the drawings.

Figure 7A:
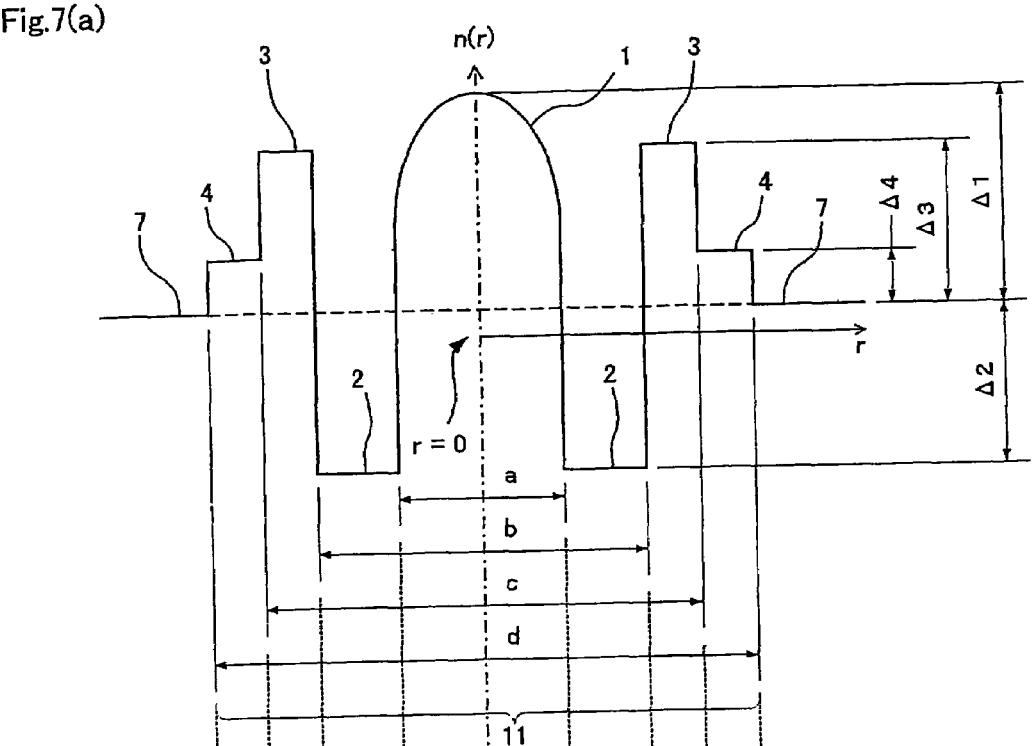
FIG. 7 shows a refractive index profile FIG. 7(a) and a cross-section FIG. 7(b) of an optical fiber in the second embodiment (four-layered), according to the present invention.
Figure 7B:
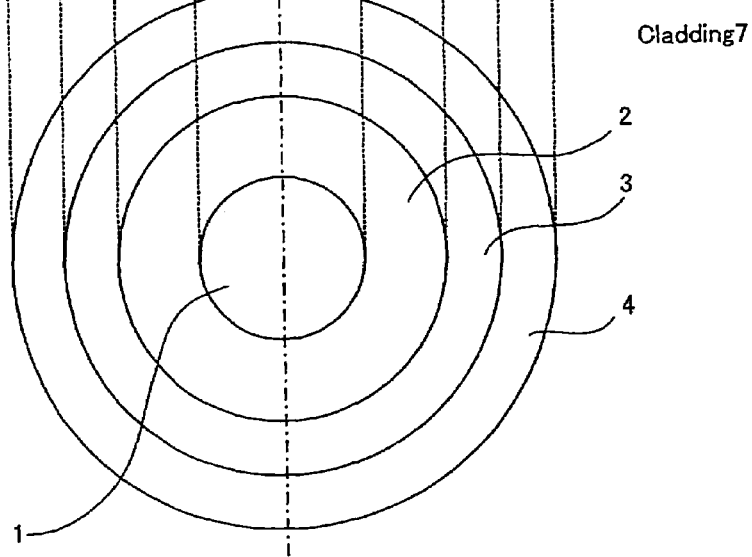
Figure 8A:
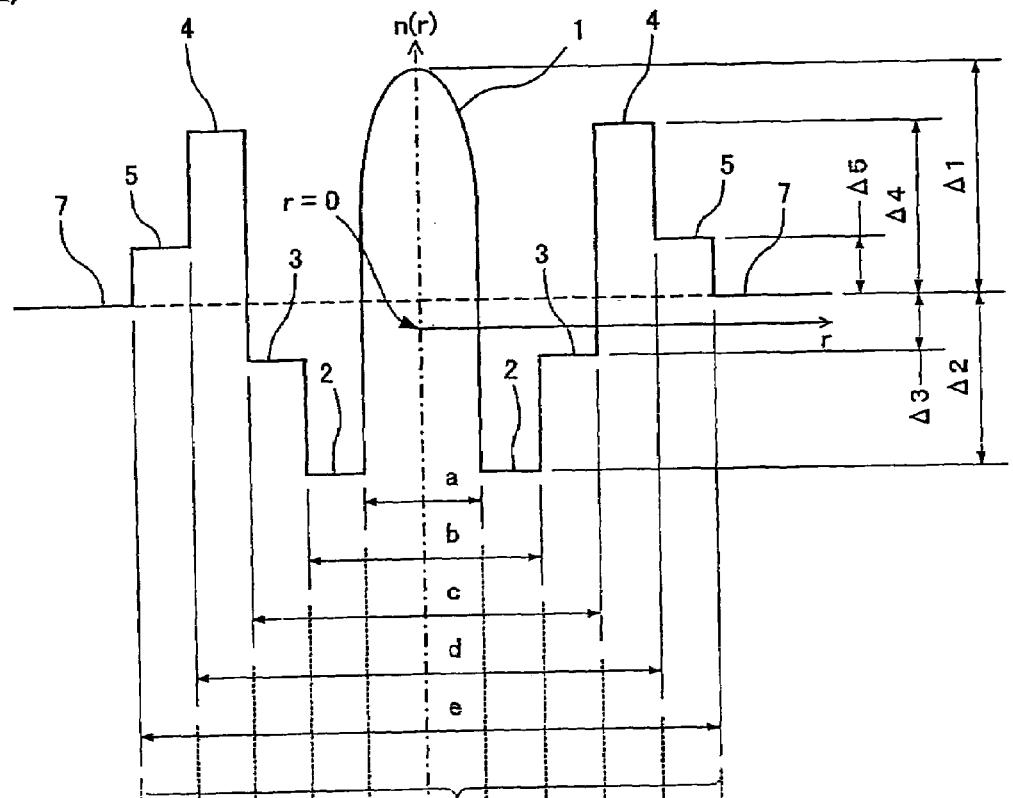
FIG. 8 shows a refractive index profile FIG. 8(a) and a cross-section FIG. 8(b) of an optical fiber in the second embodiment (five-layered), according to the present invention.
Figure 8B:
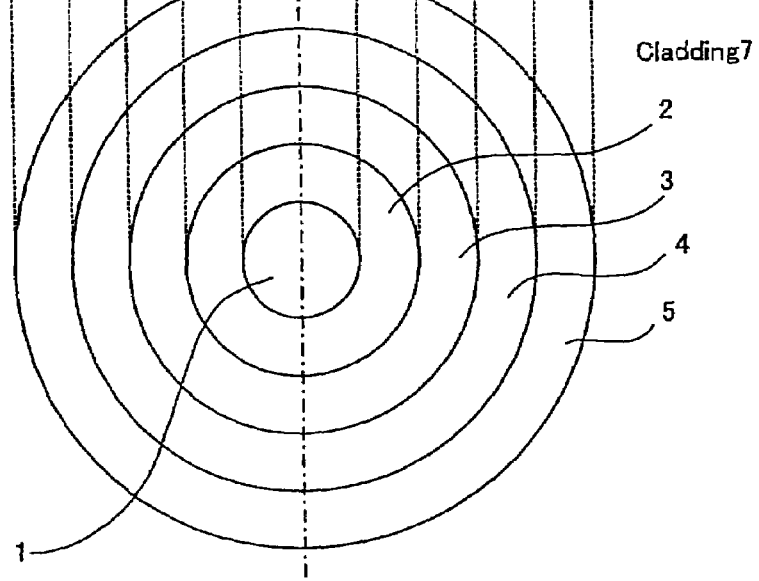

FIG. 7(a) and FIG. 8(a) show refractive index profiles and FIG. 7(b) and FIG. 8(b) show cross-sections of optical fibers according to the second embodiment of the present invention. Many kinds of the refractive profiles are available for the optical fibers. Yet, the second embodiment has a four or five-layered profile as shown in FIG. 7(a) and FIG. 8(a).

An optical fiber with a refractive index profile as in FIG. 7(a) has a core 11 at the center and a cladding 7 surrounding the core 11. In addition, the core has at least four layers (first 1, second 2, third 3, forth 4 from the center to outside), where any two adjacent layers differ in composition over each other. The layers are in a coaxial layout. The cladding serves as the reference refractive index indicator for the four layers mentioned above.

In the optical fiber having four layered core according to the second embodiment, the four relative refractive indices of the core are chosen such that $\Delta 1 > \Delta 3 > \Delta 4 > 0 > \Delta 2$ (given $\Delta 1$ for the first layer, $\Delta 2$ for the second, $\Delta 3$ for the third, $\Delta 4$ for the forth; $0$ for the cladding). In addition, the first layer, has an α-profile.

FIG. 8(a) presents another refractive index profile. An optical fiber with a refractive index profile as in FIG. 8(a) has a core 11 at the center and a cladding 7 surrounding the core 11. In addition, the core has at least five layers (first 1, second 2, third 3, forth 4, fifth 5 from the center to outside), where any two adjacent layers differ in composition over each other. The layers are in a coaxial layout. The cladding serves as the reference refractive index indicator for the five layers mentioned above.

In the optical fiber having five layered core according to the second embodiment, the five relative refractive indices of the core are chosen such that $\Delta 1 > \Delta 4 > \Delta 5 > 0 > \Delta 3 > \Delta 2$ (given $\Delta 1$ for the first layer, $\Delta 2$ for the second, $\Delta 3$ for the third, $\Delta 4$ for the forth, $\Delta 5$ for the fifth; $0$ for the cladding). In addition, the first layer has an α-profile. A layer with a negative relative refractive index difference (Lower refractive index than that of the cladding) is provided in addition to the four glass layers in FIG. 7.

The second embodiment defines "a" is diameter of first layer, "b" is diameter of second layer, "c" is diameter of third layer, "d" is diameter of fourth layer, and "e" is diameter of fifth layer.

For the refractive index profile in FIG. 7(a) and FIG. 8(a), the optimum parametric values were determined with the aid of a simulation program, for the relative refractive index differences $\Delta 1$, $\Delta 2$, $\Delta 3$, $\Delta 4$, and $\Delta 5$, α factor for the first layer, and for the diameters of each layers under the condition of a dispersion "D" of $2 \leq D \leq 8$ ps/nm/km over a range of 1400 nm to 1700 nm, an effective area of 40 μm² or more at 1550 nm, a bending loss of 5 dB/m or less at 1550 nm and a cutoff wavelength of 1550 nm or shorter. The designed parameters are shown in #2-1, #2-2, and #2-3 in Table 2.

TABLE 2

| | Δ1 | Δ2 | Δ3 | Δ4 | Δ5 | a:b:c:d:e | | | | | | Dc | λ | DP | S | Aeff | λc | BL |
|---|---|---|---|---|---|---|---|---|---|---|---|---|---|---|---|---|---|---|
| | % | % | % | % | % | α | a | b | c | d | e | μm | nm | ps/nm/km | ps/nm²/km | μm² | nm | dB/m |
| #2-1 | 0.48 | −0.46 | −0.05 | 0.4 | 0.19 | 10 | 1 | 1.7 | 2.2 | 2.6 | 2.7 | 20.0 | 1500 | 6.58 | 0.0085 | 42.0 | <1550 | <1 |
| | | | | | | | | | | | | | 1550 | 6.62 | −0.0067 | 44.6 | | 2 |
| #2-2 | 0.48 | −0.46 | −0.05 | 0.39 | 0.19 | 10 | 1 | 1.7 | 2.2 | 2.6 | 2.7 | 20.2 | 1500 | 7.17 | 0.0107 | 42.1 | <1550 | <1 |
| | | | | | | | | | | | | | 1550 | 7.30 | −0.0044 | 44.7 | | 2 |
| #2-3 | 0.5 | −0.55 | 0.38 | 0.2 | — | 8 | 1 | 1.7 | 2.1 | 2.6 | — | 20.0 | 1500 | 5.42 | 0.0079 | 43.5 | <1550 | <1 |
| | | | | | | | | | | | | | 1550 | 5.56 | −0.0019 | 46.5 | | 1 |

Dc: Core Diameter
λ: Wavelength
DS: Dispersion
D: Dispersion slope
Aeff: Effective area
λc: Cable cut off wavelength
BL: Bending loss An optical fiber of the second embodiment has a dispersion "D" of 2≦D≦8 ps/nm/km with at least one extreme value between 1400 nm and 1700 nm, making it comparatively easy to realize WDM transmission in principle without the aid of a dispersion compensation, and broad-band amplification, including distributed Raman amplification in the S-band.

Optical fibers in the second embodiment are designed to have the following parametric values and characteristic values: a dispersion "D" of −4≦D≦4 ps/nm/km at 1310 nm preferably −2≦D≦2 ps/nm/km at 1310 nm, a cutoff wavelength of 1550 nm or shorter, a bending loss of 5 dB/m or less in a bending diameter of 20 mm at 1550 nm, an effective area of 40 µm², a polarization mode dispersion of 0.1 ps √/km or less at 1550 nm, and a zero-dispersion wavelength of 1350 nm or shorter.

An optical fiber with a four layered core as shown in FIG. 7(*a*) has a first layer with a relative refractive index difference Δ1 of 0.3 to 0.7% with reference to a cladding and a diameter of 7.0 to 10 µm. The fabricated optical fiber has a diameter of 125 µm.

In addition, the first layer as shown in FIG. 7(*a*), shows a refractive index profile conforming to the following formula (6) with α of 4 or more.

$$n^2(r)=n1^2\{1-2\cdot\Delta 1\cdot(2r/a)^\alpha\} \quad (6)$$

$$0 \leq r \leq a/2$$

where n(r) expresses the refractive index at the radius "r".

In addition, an optical fiber with a four layered core as shown in FIG. 7(*a*) has, for instance, a refractive index profile as following: a relative refractive index difference of the second layer Δ2 with the cladding is −0.6 to −0.2%, a ratio of diameter of the second layer to that of the first layer is 1.2 to 1.8, a relative refractive index difference of the third layer Δ3 with the cladding is 0.25 to 0.5%, a ratio of diameter of the third layer to that of the first layer is 1.8 to 2.2, a relative refractive index difference of the forth layer Δ4 with the cladding is 0.05 to 0.2%, and a ratio of diameters of the forth, layer to the first layer is 2.0 to 2.7.

An optical fiber with a five layered core as shown in FIG. 8(*a*) has a first layer at the center whose relative refractive index difference Δ1 with reference to a cladding is 0.3 to 0.7%, and α of α-profile is 4 or more. And, the diameter of the first layer is 6.5 to 10 µm while fabricating an optical fiber with a diameter of 125 µm.

In addition, an optical fiber with a five layered core as shown in FIG. 8(*a*) has, for instance, a refractive index profile as following: the relative refractive index difference of the second layer Δ2 with the cladding is −0.6 to −0.2%, a ratio of diameter of the second layer to that of the first layer is 1.2 to 1.8, the relative refractive index difference of the third layer Δ3 with the cladding is −0.15 to −0.05%, a ratio of diameter of the third layer to the first layer is 1.8 to 2.2, the relative refractive index difference of the forth layer Δ4 with the cladding is 0.25 to 0.65%, a ratio of diameter of the fourth layer to that of the first layer is 2.0 to 2.7, the relative refractive index difference of the fifth layer Δ5 with the cladding is 0.05 to 0.50%, and a ratio of diameter of the fifth layer to that of the first layer is 2.2 to 3.0.

An optical transmission line made up of optical fibers according to the second embodiment results in an optical transmission system with a distributed Raman amplifier and a discrete Raman amplifier in at least one of the S, C and L-bands.

Figure 9:
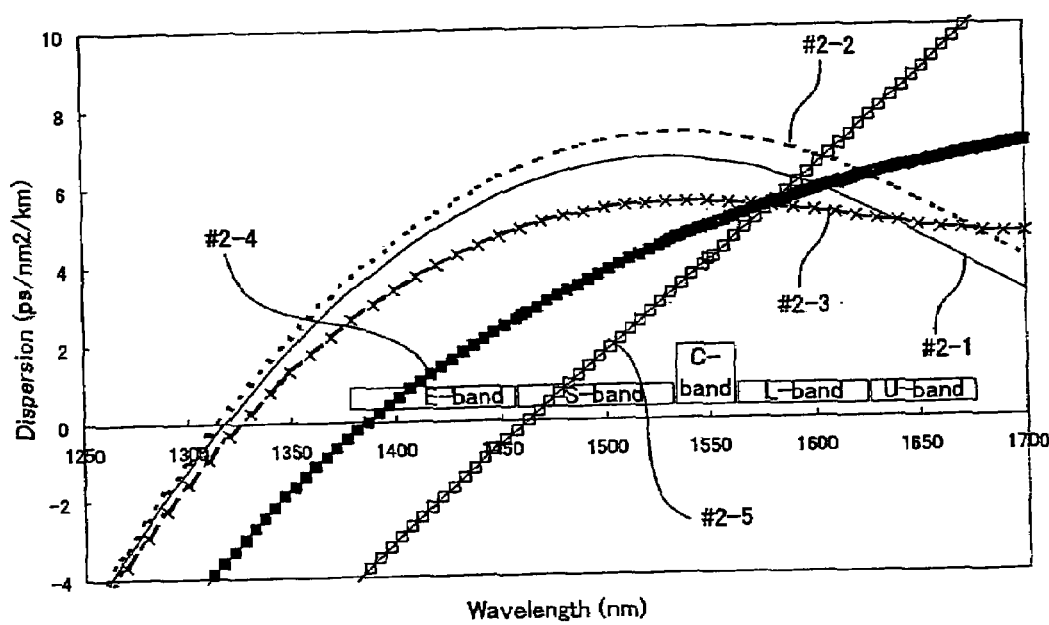
FIG. 9 draws wavelength characteristics of the chromatic dispersion of the optical fibers in the second embodiment according to the present invention.

Optical fibers were made, according to the parametric values in Table 2, and turned out to have almost the designed dispersions. Samples #2-1 and #2-2 have five-layered core as shown in FIG. 8(*a*) and #3-3 has four-layered core as shown in FIG. 7(*a*). Table 2 presents dispersions at 1500 nm and 1550 nm, dispersion slopes at 1500 nm and 1550 nm, effective areas at 1500 nm and 1550 nm, cable cutoff wavelength (λc), bending losses in 20 mm diameter at 1500 nm and 1550 nm, zero dispersion wavelength λo, here core diameter is "d" as in FIG. 7, diameter is "e" as in FIG. 8. FIG. 9 shows the dispersion characteristics vs. wavelength for the optical fibers #2-1, #2-2 and #2-3. All the fibers have a dispersion "D" of 2≦D≦8 ps/nm/km in a wavelength band of 1400 to 1700 nm, each having an extreme value in the same band. With paying attention to dispersion slope, the dispersion slope is positive at 1500 nm and negative at 1550 nm, thereby has an extreme value between 1500 nm and 1550 nm. Meantime, a cable cutoff wavelength was 1550 nm or shorter, and a bending loss was 5 dB/m or less in a bending diameter of 20 mm at 1550 nm. As shown in FIG. 9, a zero-dispersion wavelength λo was 1350 nm or shorter, where the Raman amplification band could be expanded to the S-band. Moreover, an effective area was maintained to 40 µmm² or more (preferably 45 µmm² or more), thereby suppressing non-linearity as in the conventional DSF.

As shown in FIG. 9, each fiber according to the second embodiment has at least an extreme value of the dispersion in the given wavelength band, which refers to neither monotonous increase nor monotonous decrease, suppressing the FWM and providing a broader wavelength band of a desirable level of 2-8 ps/nm/km (see Table 2), compared to the conventional optical fiber #2-4: reduced dispersion slope NZ-DSF, dispersion slope of 0.020 ps/nm²/km at 1550 nm, and #2-5: True Wave (registered trademark) RS, dispersion slope of 0.045 ps/nm²/km at 1550 nm).

Here, a dispersion is 2-8 ps/nm/km in the wavelength band of 1400 nm to 1700 nm and can suppress FWM and cumulative dispersion in itself, which enables the transmission without the aid of dispersion compensation. The conventional NZ-DSF, proposed so far, enables the transmission at most in the S-, C- and L-bands (1460-1625 nm, see #2-4 in FIG. 9). The present NZ-DSF has dispersion characteristics enabling transmission in the U-band (1625-1675 nm) and E-band (1360-1460 nm) in addition to the above three bands. At present, the U-band transmission are limited by bending loss and UV absorption loss increases, while the E-band transmission is limited mainly by hydroxyl ion loss at 1385 nm or thereabout. From this perspective, the present NZ-DSF has a moderate dispersion applicable for the U- and E-band, with breaking through the above two limitations, which does not require a need of a dispersion compensator even in the U-band. Also, featuring is a relatively flat dispersion over the wavelength bands. Especially, the #2-3 in FIG. 9 has a dispersion difference of not more than 1 ps/nm/km (0.7 ps/nm/km or less) in the S-, C- and L-bands (1460-1625 nm), which shows a most flat dispersion in a broad wavelength band.

Even in the case of applying the present optical fiber to an optical transmission system with a distributed Raman amplification, the dispersion of the present fiber is 2 ps/nm/km or more at the shortest wavelength of the Raman pumping band (1350-1360 nm), which prevents the FWM generation. That is, the present optical fiber has a moderate dispersion of around 2 ps/nm/km at 1350-1360 nm which corresponds to the pump light wavelength for the shortest wavelength of 1460 nm in the S-band. The dispersion of the present fiber in the Raman pumping wavelength band for the C or L band transmission is, of course, 2 ps/nm/km or more and #2-1, #2-2 and #2-3 in Table 2 can be applied to the distributed Raman amplification in the S, C and L-bands, considering their dispersion curves.

Figure 14:
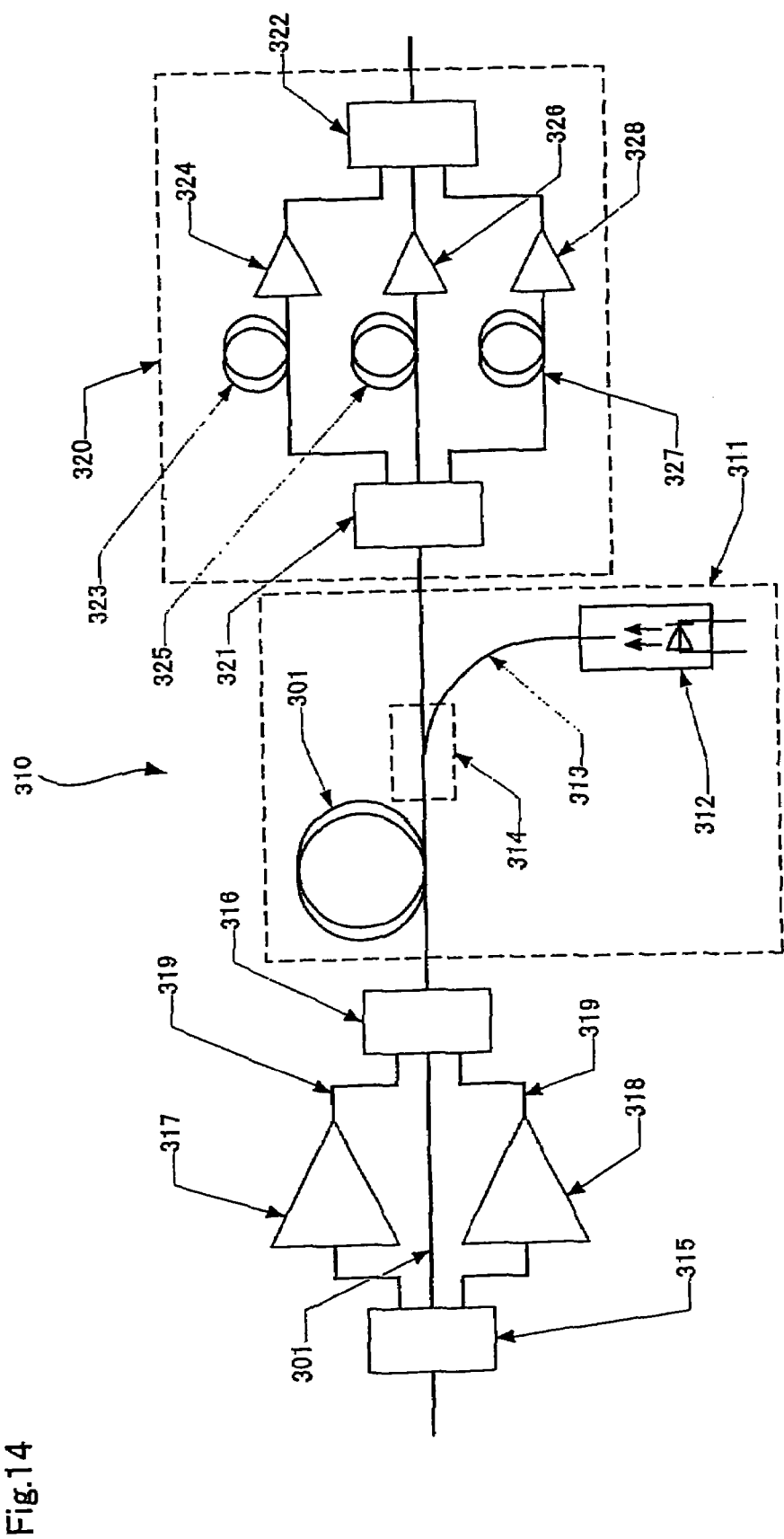
FIG. 14 is a diagram of an optical transmission system with optical fibers according to the present invention.
Figure 15:
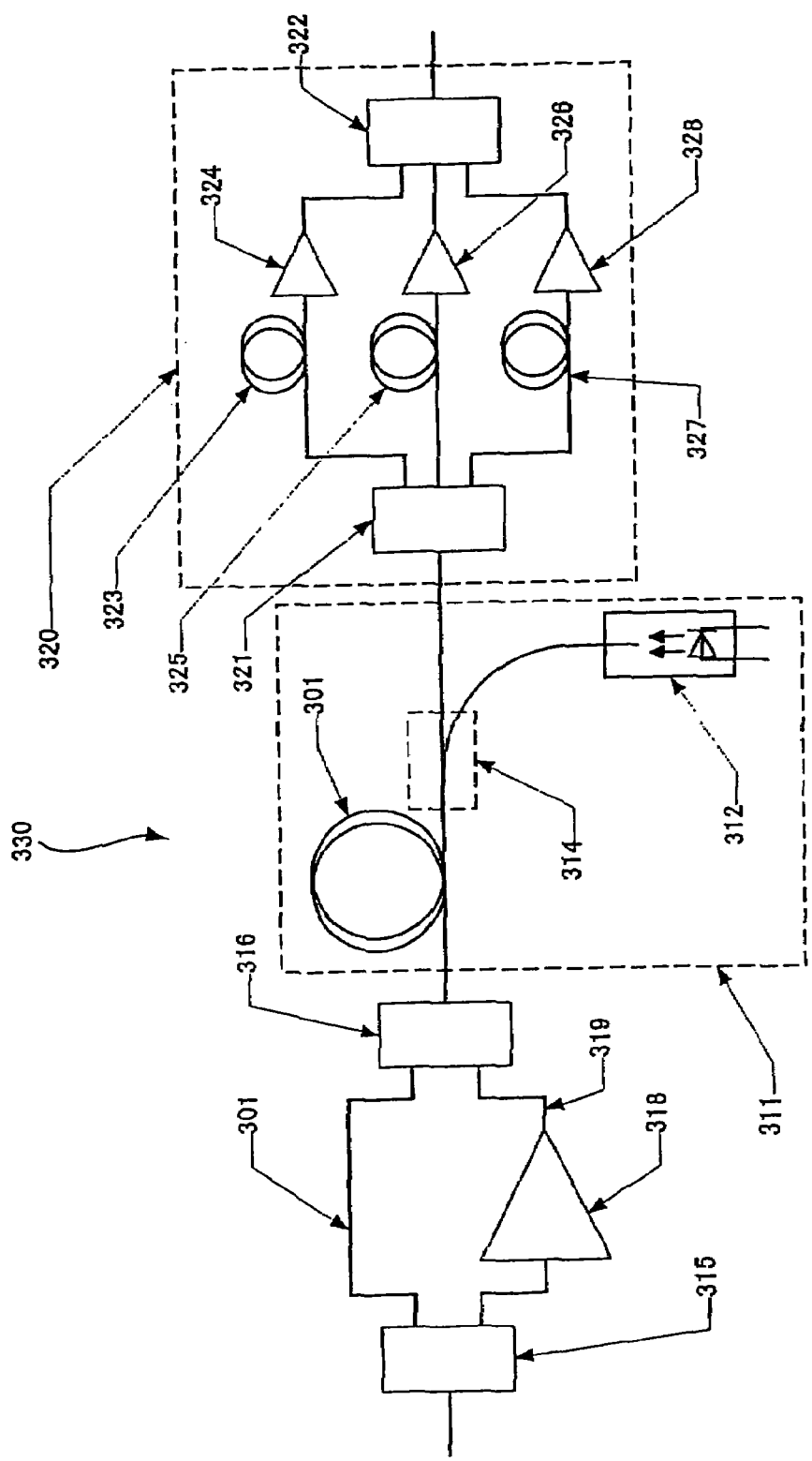
FIG. 15 is a diagram of another optical transmission system with optical fibers according to the present invention.

FIG. 14 and FIG. 15 show an optical communication systems with an optical transmission line using the second embodiment optical fibers. Detail description of these drawings is mentioned later.

As shown in the above, the dispersion characteristics of optical fibers according to the second embodiment can allow distributed Raman amplification in the S, C and L-bands simultaneously. However, simultaneous Raman amplification over the S, C and L-bands can hardly be made workable, because the pumping light wavelengths overlap the transmission light wavelengths. This problem can be solved, by providing a distributed Raman amplifier for the S- and C-bands and a discrete Raman amplifier or an EDFA for the L-band, for example.

Embodiment 3

Hereinafter, the third, embodiment of this invention is described with reference to the drawings.

Figure 10A:
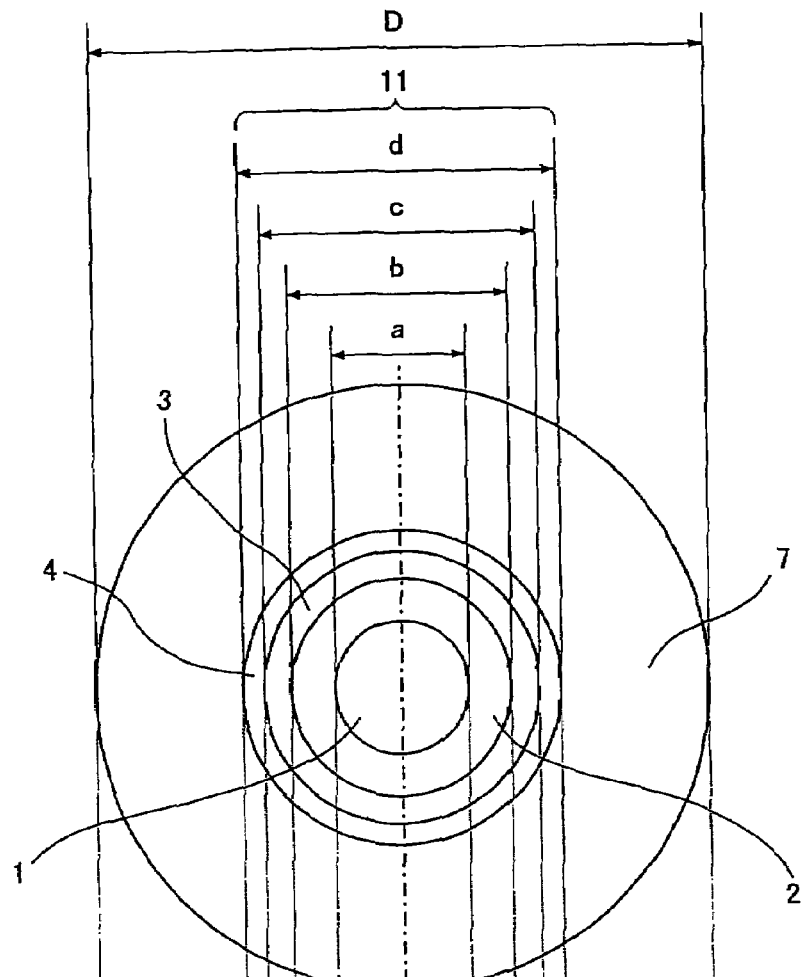
FIG. 10 shows a refractive index profile FIG. 10(a) and a cross-section FIG. 10(b) of an optical fiber in the third embodiment according to the present invention.
Figure 10B:
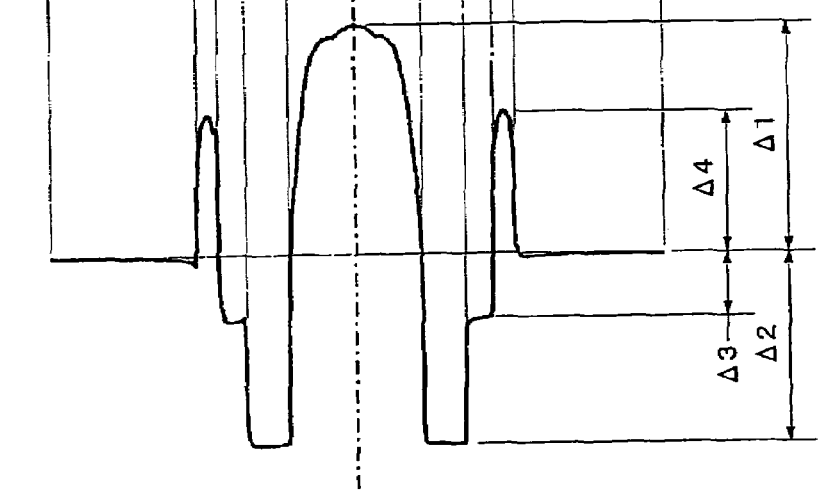

FIG. 10(a) shows refractive index profiles and FIG. 10(b) shows a cross-section in the third embodiment of an optical fiber according to the present invention. Various types of the refractive index profiles are available for optical fibers. Yet, the third embodiment applies a refractive index profile, as shown in FIG. 10(a).

An optical fiber with a refractive index profile as shown in FIG. 10(a) has a core 11 at the center and a cladding 7 surrounding the core 11. In addition, the core has at least four layers (first 1, second 2, third 3, forth 4 from center to outside), and cladding 7, where any two adjacent layers differ in composition over each other. The layers are in a coaxial layout. The cladding serves as the reference refractive index indicator for the four layers.

The relative refractive index differences of the first, second, third and forth layers (given $\Delta 1$, $\Delta 2$, $\Delta 3$ and $\Delta 4$) with reference to cladding 7 are chosen such that $\Delta 1 > \Delta 4 > \Delta 3 > \Delta 2$, where any adjacent two layers differ in refractive index.

In addition, the first layer as shown in FIG. 10, has $\alpha$-profile with $\alpha$ of 4 or more.

Subsequently, the first layer 1 is made to a relative refractive index difference $\Delta 1$ of not less than 0.3 and not more than 0.7%, and a ratio of diameters of the first layer "a" to the cladding "D" of 0.05 to 0.1. For example, in the case with the cladding diameter D of 125 µm, the first layer is required to be 6.5 to 12 µm in diameter a.

Meanwhile, the second layer 2 is made to a relative refractive index difference $\Delta 2$ of not less than −0.6 and not more than −0.2%, and a ratio of diameters of the second layer "b" to the first layer "a" of 1.3 to 1.8.

The third layer 3 is made to a relative refractive index difference $\Delta 3$ of not less than −0.2 and not more than −0.05%, and a ratio of diameters of the third layer "c" to the first layer "a" of 1.9 to 2.4. The forth layer 4 is made to a relative refractive index difference $\Delta 4$ of not less than 0.1 and not more than 0.55%, and a ratio of diameters of the fourth layer "d" to the first layer "a" of 2.6 to 2.8. Here, the above relative refractive index differences of $\Delta 1$ to $\Delta 4$ and diameters of "a" to "d" of first, second third and forth layers in the refractive index profile as shown in FIG. 10 are defined as the average values of horizontal and vertical portions, respectively.

Here, the relative refractive index differences $\Delta 1$, $\Delta 2$, $\Delta 3$ and $\Delta 4$, diameters a, b, c and d, and $\alpha$ factor of the optical fiber was determined as shown below. For the optical fiber as shown in FIG. 10, simulation was made, varying the above parameters of relative refractive index differences $\Delta 1$, $\Delta 2$, $\Delta 3$ and $\Delta 4$, $\alpha$ factor and diameters a, b, c and d. As a result, the dispersion over the S, C and L-bands (1460-1625 nm) fell within a range of 2 to 8 ps/nm/km and a difference between the maximum and minimum dispersion was not more than 4 ps/nm/km. The optimum values for $\Delta 1$, $\Delta 2$, $\Delta 3$ and $\Delta 4$, a, b, c and d, and a were figured out, and optimum values at the wavelength of 1550 nm are shown in Table 3.

TABLE 3

|  | $\Delta 1$ | $\Delta 2$ | $\Delta 3$ | $\Delta 4$ | $\alpha$ | a:b:c:d a | b | c | d |
|---|---|---|---|---|---|---|---|---|---|
| #3-1 | 0.47 | −0.4 | −0.05 | 0.4 | 8 | 1 | 1.7 | 2.1 | 2.6 |
| #3-2 | 0.48 | −0.45 | −0.1 | 0.4 | 8 | 1 | 1.5 | 2.1 | 2.5 |
| #3-3 | 0.50 | −0.45 | −0.1 | 0.35 | 8 | 1 | 1.5 | 2.1 | 2.5 |
| #3-4 | 0.48 | −0.4 | −0.05 | 0.4 | 6 | 1 | 1.6 | 2.1 | 2.5 |
| #3-5 | 0.52 | −0.4 | −0.1 | 0.4 | 4 | 1 | 1.5 | 2.1 | 2.5 |

The above simulation was made by using subparameters of dispersion at 1550 nm, dispersion slope at 1550 nm, effective area at 1550 nm, the cable cutoff wavelength in a length of 22 m, zero-dispersion wavelength, and bending loss in 20 mm diameter at 1550 nm, which change in along with the change of relative refractive index differences $\Delta 1$, $\Delta 2$, $\Delta 3$ and $\Delta 4$, $\alpha$ factor and diameters a, b, c and d.

Table 4 presents the values of the subparameters which result in the value of parameters in Tables 3. The wavelength characteristics of the chromatic dispersion for simulated optical fibers #3-1 to #3-5 are plotted in FIG. 11.

TABLE 4

|  | Dispersion | Dispersion slope | Aeff | $\lambda c$ | $\lambda o$ | Bending loss | Core diameter |
|---|---|---|---|---|---|---|---|
| #3-1 | 6.12 | 0.0016 | 46 | <1550 | 1334 | 3.0 | 19.3 |
| #3-2 | 7.56 | 0.0095 | 45 | <1550 | 1328 | 2.0 | 18.8 |
| #3-3 | 4.41 | 0.0007 | 44 | <1550 | 1355 | 2.0 | 18.7 |
| #3-4 | 7.28 | 0.0096 | 47 | <1550 | 1333 | 1.0 | 19.7 |
| #3-5 | 7.74 | 0.0096 | 43 | <1550 | 1335 | 3.0 | 18.9 |

Simulation results in Table 4 were obtained when the parameters of relative refractive index differences $\Delta 1$ to $\Delta 4$, $\alpha$ factor and diameters a to d are applied as per Table 3. In all of simulation cases, an optical fiber had a dispersion of 2 ps/nm/km or more at 1550 nm in the C-band, and a dispersion slope of positive and not more than +0.010 ps/nm$^2$/km, a cable cutoff wavelength ($\lambda c$) of 1550 nm or shorter and a bending loss of 5 dB/m or less in 20 mm diameter.

In addition, all of the zero-dispersion wavelengths ($\lambda o$) in Table 4 are 1360 nm or shorter, and the optical fibers in the third embodiment make it possible to expand the transmission wavelength band, which enables Raman amplification, to the S-band. As these optical fibers in Table 4 each have an effective area of 40 µm$^2$ or more, it is expected to suppress the non-linearity effect when WDM transmission is made at a wavelength which allows the same effective area to be available.

Figure 11:
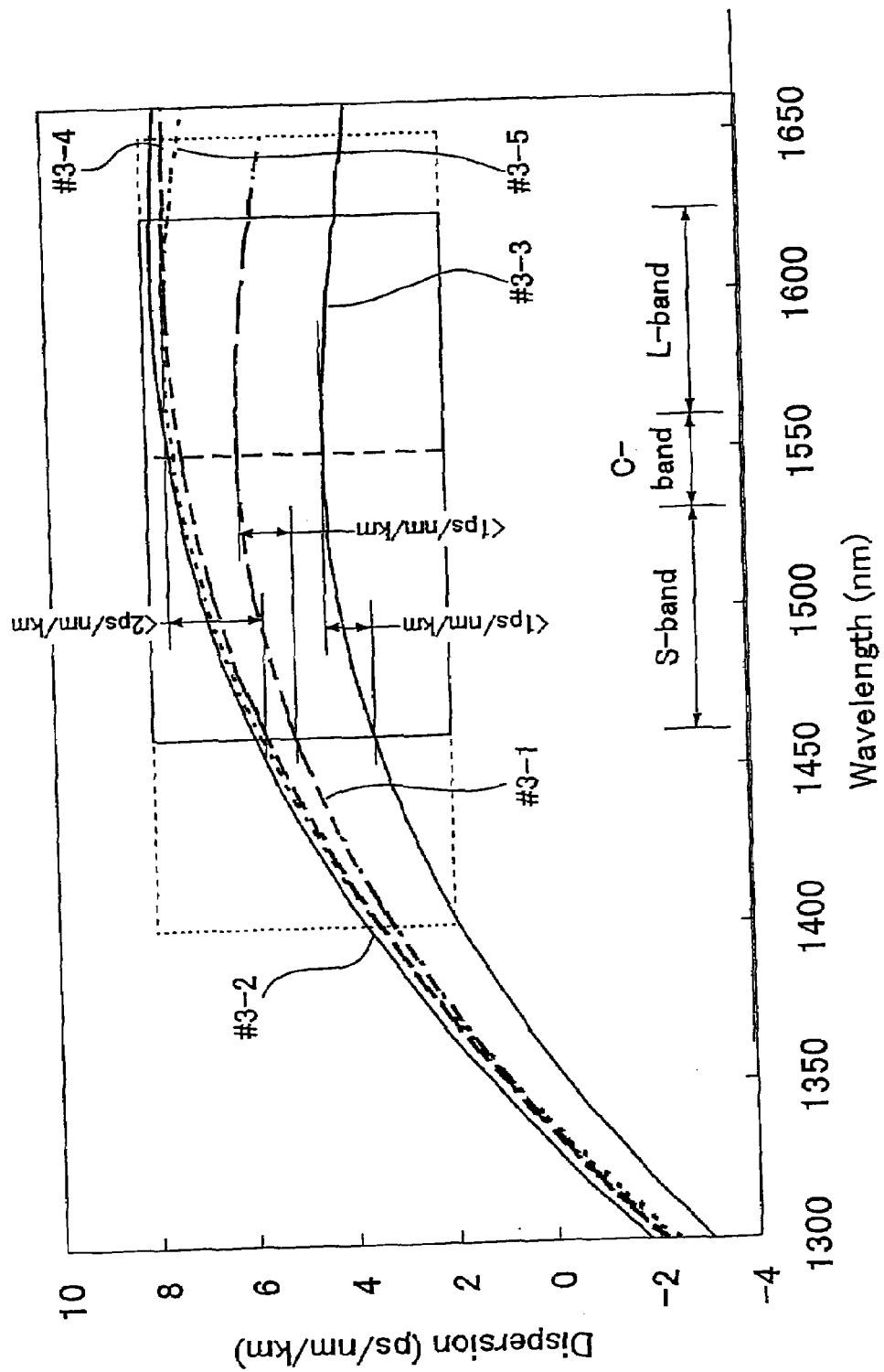
FIG. 11 draws simulated chromatic dispersion characteristics of the of the optical fibers in the third embodiment according to the present invention.

Meanwhile, additionally considering FIG. 11, optical fibers conforming to relative refractive index differences $\Delta 1$ to $\Delta 4$, $\alpha$ factor and diameters a to d in Table 3, turn out to have a difference between the maximum, and minimum dispersion of not more than 2 ps/nm/km throughout a wavelength band between 1460 and 1625 nm. In other words, their dispersion slopes were reduced remarkably, throughout the broad band of 1460 nm to 1625 nm. Simulated characteristics of optical fibers in the third embodiment are a dispersion of 2 to 8 ps/nm/km between 1400 and 1650 nm, particularly between 1370 and 1650 nm except #3-3, and it is possible to realize broad band of flatness in dispersion over a wavelength span of 250 nm (a wavelength span of 280 nm except #3-3) and suppression of the FWM generation.

Figure 12:
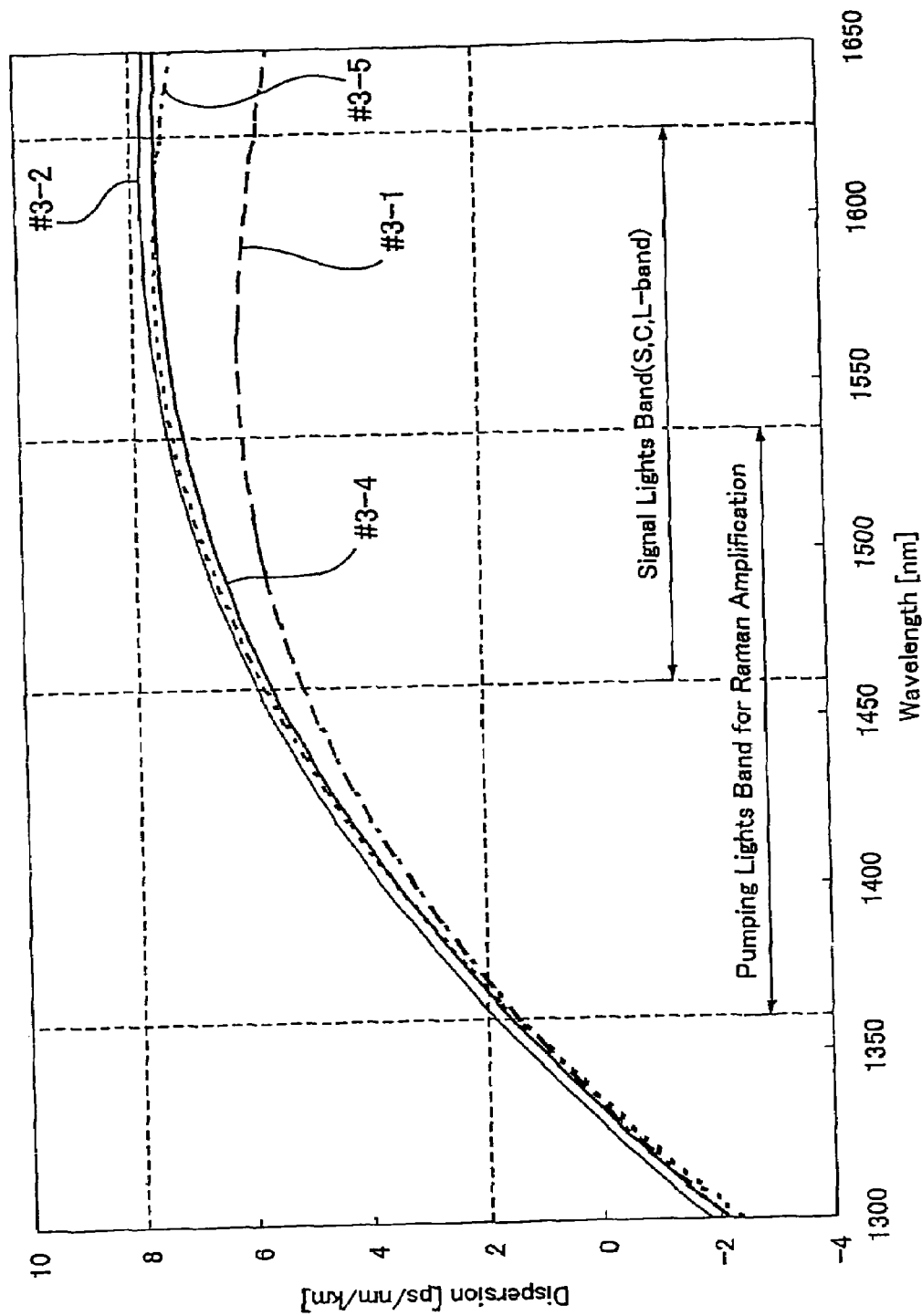
FIG. 12 is a graph adds a Raman amplification band (1360-1525 nm) and wavelength characteristics of the chromatic dispersion for an optical fiber, with a dispersion of 2 to 8 ps/nm/km in the same band to FIG. 11.

Now, FIG. 12 presents the Raman pumping wavelength band of 1360 to 1525 nm for the transmission wavelength band of 1460 to 1625 nm in addition to FIG. 11, along with the dispersion curve for a optical fiber with a dispersion of 2 to 8 ps/nm/km in the Raman pumping wavelength band. FIG. 12 shows that as a result of simulation, optical fibers in the third embodiment have a zero-dispersion wavelength shorter than the Raman pumping band, unlike the conventional DSF, making it possible to realize distributed Raman amplification over the S, C and L-bands (1460 to 1625 nm).

The optical fiber according to the third embodiment in the present invention has at least four layers (first to forth layers 1 to 4), and is allowed to have five layers or more.

Three types of optical fibers were made on trial, based on the simulation results in Tables 3 and 4, and measured for dispersion, dispersion slope, effective area, cable cutoff wavelength and zero-dispersion wavelength, each at 1460 nm, 1550 nm and 1620 nm, including bending loss in 20 mm diameter at 1550 nm. Table 5 presents the measured results of #5-1, #5-2 and #5-3, and moreover FIG. 13 shows their dispersion characteristics.

TABLE 5

|      | Dispersion |         |         | Dispersion slope | Aeff    | λc    |      | Bending loss |
|------|------------|---------|---------|------------------|---------|-------|------|--------------|
|      | 1460 nm    | 1550 nm | 1625 nm | 1550 nm          | 1550 nm | 22 m  | λo   | 1550 nm      |
| #5-1 | 5.32       | 7.02    | 7.07    | 0.0087           | 45      | 933   | 1340 | 5            |
| #5-2 | 4.32       | 5.75    | 5.51    | 0.0054           | 45      | 925   | 1352 | 8            |
| #5-3 | 5.81       | 7.71    | 7.95    | 0.0100           | 45      | 945   | 1335 | 2            |

Figure 13:
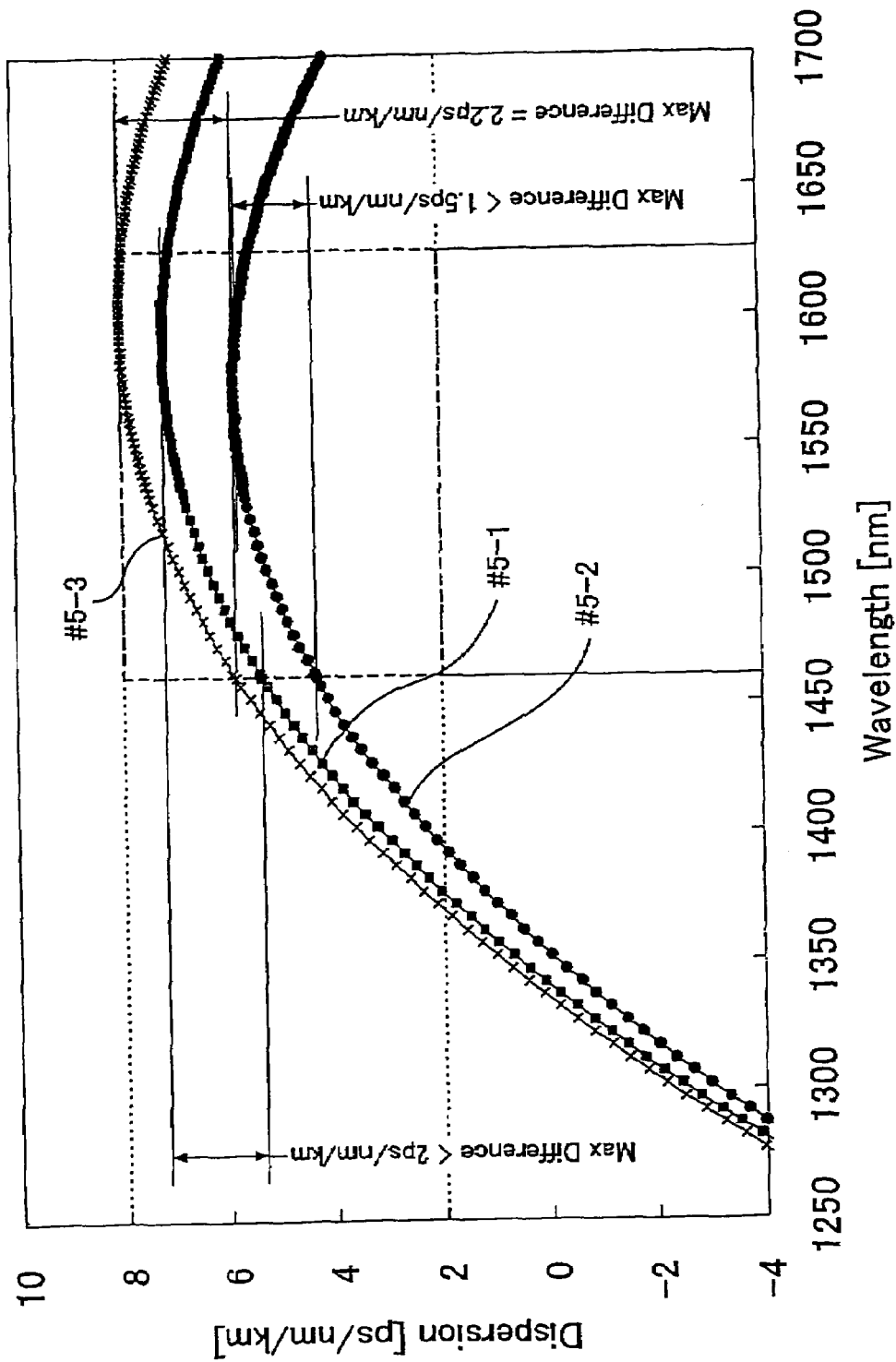
FIG. 13 draws chromatic dispersion characteristics of for the optical fibers in the third embodiment according to the present invention.

As apparent from Table 5 and FIG. 13, trials #5-1, #5-2 and #5-3 were made so that relative refractive index differences Δ1 to Δ4, α factor and diameters a to d wore the above-mentioned values. As a result, they had 2 to 8 ps/nm/km in dispersion and at most 0.01 ps/nm$^2$/km in dispersion slope in the S, C and L-bands (1460 to 1625 nm), and thereby the difference between the maximum and minimum dispersion of each fiber was not more than 3 ps/nm/km. Each fiber had a dispersion of not less than 2 ps/nm/km in S-band of 1460 to 1530 nm, and thereby it was possible to suppress the FWM generation. In addition, as shown in Table 5, all of the trials #5-1, #5-2 and #5-3 had a cable cutoff wavelength of not longer than 950 nm, and an effective area ($A_{eff}$) of not less than 40 μm$^2$, and thereby it was possible to suppress the non-linearity effect.

However, the specified parameters in the third embodiment for relative refractive index differences Δ1 to Δ4, α factor and diameters a to d, are based on simulation results, and therefore might not consistent with those of actually made optical fibers. For example, the simulation showed a bending loss of 5 dB/m or less, but the trials had greater ones than simulated. Therefore, a bending loss might be close to 10 dB/m if an optical fiber is made so that the above-mentioned parameters for relative refractive index differences Δ1 to Δ4, α factor and diameters a to d.

In addition, the three trials were estimated for mode field diameter (MFD), transmission loss and polarization mode dispersion (PMD) with transmission signals at 1550 nm, and the results are shown in Table 6.

TABLE 6

|      | MFD 1550 nm | Transmission loss 1550 nm | PMD   |
|------|-------------|---------------------------|-------|
| #5-1 | 7.5         | 0.218                     | 0.029 |
| #5-2 | 7.5         | 0.254                     | 0.043 |
| #5-3 | 7.5         | 0.207                     | 0.049 |

Here, trials were made so that relative refractive index differences Δ1 to Δ4, α factor and diameters a to d had the above-mentioned values, and thereby had a mode field diameter of 7.5 μm, a transmission loss of 0.207 to 0.254 dB/km and a polarization mode dispersion of 0.029 to 0.049 ps/√km as shown in Table 6. All of these characteristics fell within preferable range, particularly, the PMD is less than 0.10 ps/√km. Thereby it is possible to prevent the degradation of the WDM transmission in quality by reducing the PMD as much as possible. In addition, all of the trials #5-1, #5-2 and #5-3, have a zero dispersion wavelength (λo) of 1360 nm or shorter. Consequently in the optical fiber according to the third embodiment, it is possible to expand the transmission band, applicable for Raman amplification, to the S-band because the problem such as FWM in the Raman pump light band can be prevented.

Thus, trials #5-1, #5-2 and #5-3 demonstrates that in optical fibers according to the third embodiment, reduced dispersion slope leads to a flattened wavelength characteristic of dispersion and furthermore lowered cumulative dispersion on the longer wavelength-side. Moreover, it is possible to expand a wavelength band of avoiding FWM occurrence to the shorter wavelength-side. Consequently, it turns out to realize the WDM transmission in all of the S, C and L-bands.

FIG. 14 shows a diagram for a first example optical transmission system according to the third embodiment. Optical transmission system 310 comprises of optical fibers according to the third embodiment as the optical transmission line, a distributed optical amplifier 311, a discrete optical amplifiers 317, 318 for amplifying at least one of the S, C and L-bands, and a dispersion compensator 320.

In the transmission line, a multiplexer 316 and a demultiplexer 315 are located apart from each other at the inlet of the distributed Raman amplifier 311, and the dispersion compensator 320 is located at the outlet of the distributed Raman amplifier 311.

Distributed Raman amplifier 311 has a pump light source 312 for the S-band and a demultiplexer 314, and the pump light source 312 is connected to the demultiplexer 314 through the optical fiber 313 and applied to the counter-propagation pumping for the S-band transmission signals.

Discrete optical amplifiers 317 and 318 are erbium-doped fiber amplifiers (EDFA) connected to demultiplexer 315 and multiplexer 316, through optical fibers 319. The former 317 is provided for the C-band and the latter 318, for the L-band.

Dispersion compensator 320 has three dispersion compensating fibers 323, 325, 327, which interconnect demultiplexer 321 and multiplexer 322. Dispersion compensating fibers 323, 325, 327, are provided for S, C and L-bands, respectively, and equipped with optical amplifiers 324, 326, 328, to compensate the signal loss in each band.

Optical transmission system 310 in the first example comprises of optical fibers according to the third embodiment, as the transmission line, and a distributed Raman amplifier 311. Accordingly, optical transmission system 310 makes it possible to reduce the required maximum power given to the optical fiber, and thereby makes it possible to suppress signal distortion due to a non-linearity effect in the optical fiber.

In addition to the above distributed Raman amplifier, a discrete Raman amplifier is available, but a non-linearity effect cannot be negligible if the discrete Raman amplifier is applied to a WDM transmission. Yet, optical transmission system 310 in the first example comprises of an optical fiber having an effective area ($A_{eff}$) of 40 μmm$^2$ or more at 1550 nm, and therefore makes it possible to prevent a signal distortion due to a non-linearity effect in the 1550 nm WDM transmission.

FIG. 15 shows a diagram for a second example optical transmission system of the third embodiment. Optical transmission system 330 makes pump light source 312 to serve for counter-propagation pumping in the C- and S-bands, unlike the pump light source of 312 in FIG. 14.

Therefore, optical transmission system as shown in FIG. 15 requires only a discrete optical amplifier for the L-band, without a need of a discrete optical amplifier for the C-band. Therefore, it is possible to reduce number of optical devices constructing an optical transmission system.

Figure 16:
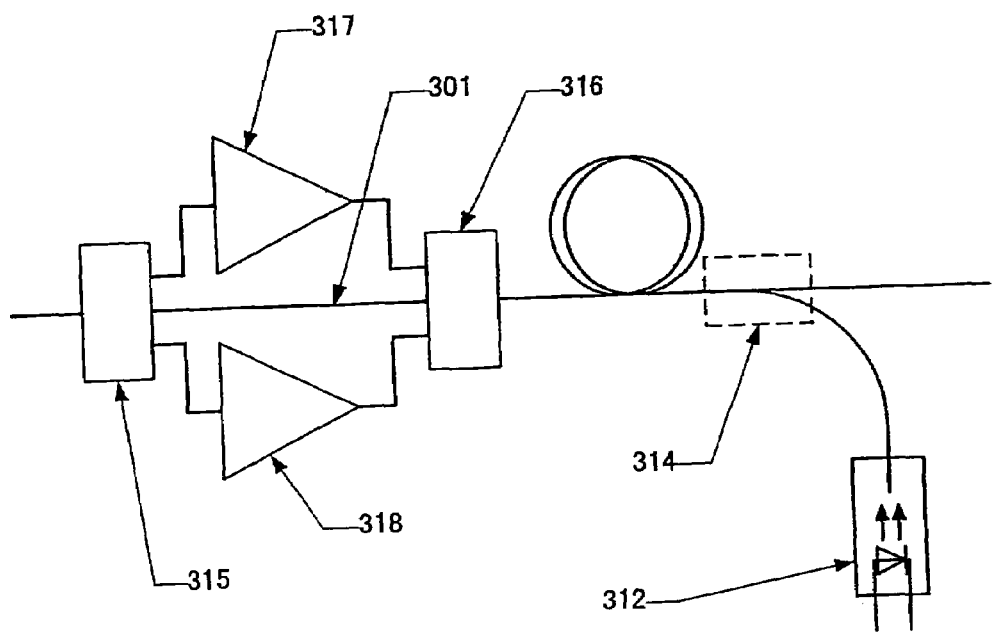
FIG. 16 is a diagram of more other optical transmission system with optical fibers according to the present invention.

Moreover, the optical fiber according to the third embodiment makes it possible to reduce a cumulative dispersion, and so it isn't necessary to apply any dispersion compensator 320 as shown in FIG. 14 or FIG. 15, at the 10 Gps signal transmission. Therefore as shown in FIG. 16, it is possible to even reduce number of optical devices. Similarly, optical fibers according to the third embodiment have a least dispersion difference throughout the band, and hence makes it possible to apply the conventional dispersion compensator designed for the standard single-mode optical fiber at high speed transmission of 40 Gbps or more, and thereby has an advantage of not requiring a new design of a dispersion compensator.

Embodiment 4

Hereinafter, the fourth embodiment of this invention is described with reference to the drawings.

Figure 17A:
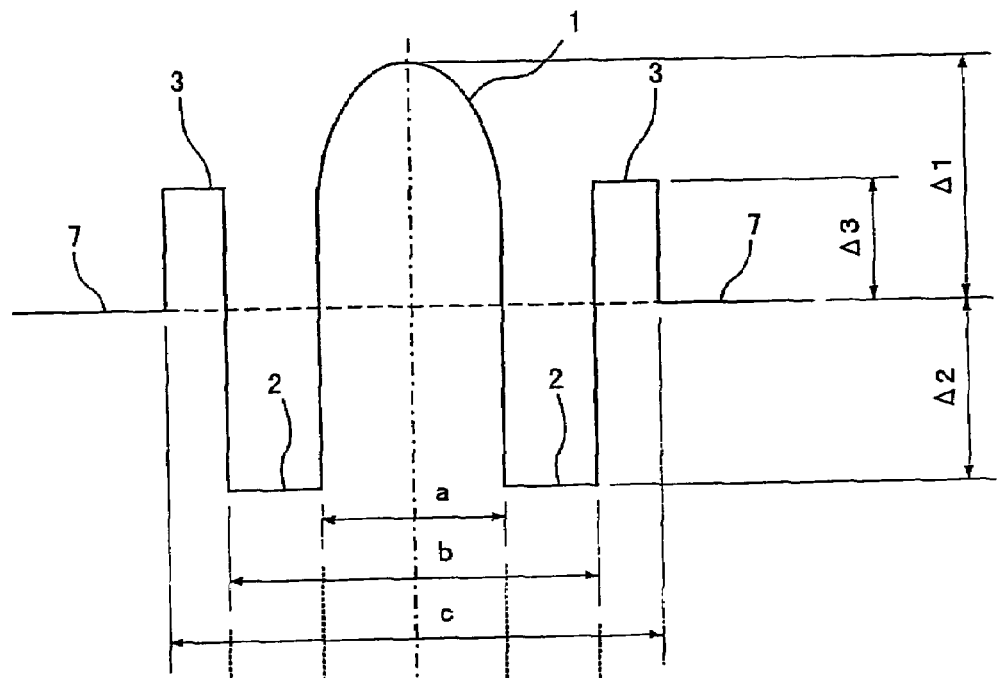
FIG. 17 shows a refractive index profile FIG. 17(a) and a cross-section FIG. 17(b) for an optical fiber in the fourth embodiment according to the present invention.
Figure 17B:
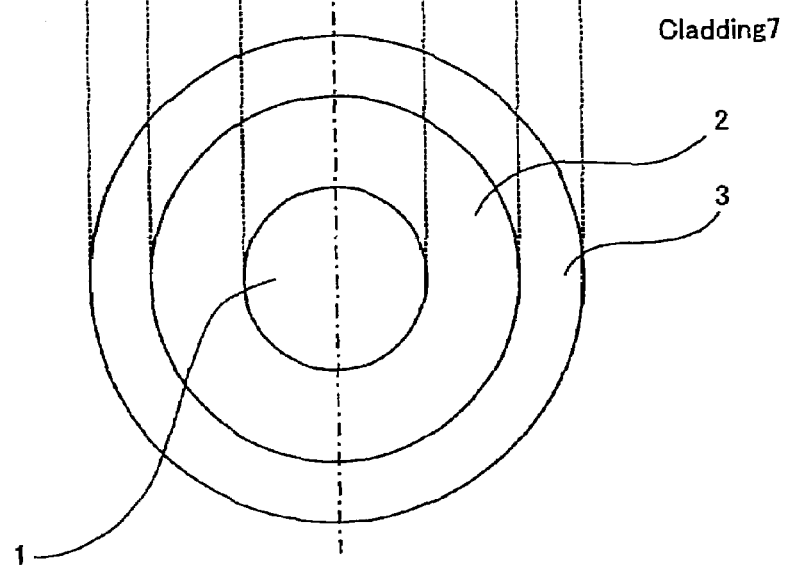

FIG. 17(a) shows a refractive index profile and FIG. 17(b) shows a cross-section of an optical fiber according to the fourth embodiment of the present invention. The refractive index profile in FIG. 17(a) features to be relatively simple and easy to design and control, compared to the other profiles.

Optical fiber comprises a core 11 at the center and a cladding 7 surrounding the core 11. In addition, the core has at least three layers (first 1, second 2, and third 3 from center to outside), and cladding 7 with the reference refractive index, where any two adjacent layers differ in composition over each other. The layers are in a coaxial layout. The cladding serves as the reference refractive index indicator for the three layers.

In addition, relative refractive index differences of the first layer 1 and the third layer 3 with the cladding 7 are made positive, and that of the second layer 2 is made negative. First layer 1 has an α-profile.

In the optical fiber having three layered core according to the forth embodiment, the three relative refractive indices of the core are chosen such that $\Delta1>\Delta3>0>\Delta2$ (given $\Delta1$ for the first layer, $\Delta2$ for the second, $\Delta3$ for the third, 0 for the cladding).

Here, "a" denotes a diameter of first layer 1, "b" denotes a diameter of second layer 2, "c" denotes a diameter of third layer 3. The parameters of $\Delta1$, $\Delta2$ and $\Delta3$ in relative refractive index and a, b and c in diameters of each layers which are applied in the fourth embodiment are not limited to a particular value, but preferably over the following range, That is the preferred ranges of relative refractive index differences are: 0.3 to 0.8% for $\Delta1$, −0.6 to 0.05% for $\Delta2$, and 0.05 to 0.4% for $\Delta3$. Also, the preferred ratio of diameters are: 1.5 to 2.2 for b/a and 2.2 to 3.5 for c/a.

An optical fiber in the fourth embodiment has a dispersion of 4 ps/nm/km or more at 1550 nm, and a positive dispersion slope of 0.050 ps/nm$^2$/km or less (preferably positive and not more than 0.025 ps/nm$^2$/km) at least at a predetermined wavelength within a range of 1460 nm to 1625 nm.

An optical fiber in the fourth embodiment has a cutoff wavelength of 1550 nm or shorter (preferably 1450 nm or shorter) at a length of 2 m, a zero-dispersion wavelength of 1460 nm or shorter (preferably 1400 nm or shorter) and a transmission loss of 1.5 dB/km or less at 1385 nm.

An optical fiber in the fourth embodiment has an effective area of 40 to 60 μm$^2$ (preferably 45 μmm$^2$ or less) in a predetermined wavelength within a wavelength range of 1460 nm to 1625 nm, and bending loss of 5 dB/m or less in a bending diameter of 20 mm in at 1550 nm and a polarization mode dispersion of 0.08 ps/$\sqrt{km}$ or less at 1550 nm.

The present inventor, at first, made studies to determine the construction of optical fibers in the fourth embodiment, applicable for the WDM transmission mainly in the C-band.

As in general in the Raman amplification for the C-band, a pump light wavelength is 1420-1430 nm for the shortest wavelength of 1530 nm and a pump light wavelength is 1455-1465 nm for the longest wavelength of 1565 nm. Here a difference of the pump light power would be preferably within ±10% over the wavelength band.

In other words, should the pump power fall within ±10% difference, all the WDM transmission signals can be adjusted to a required gain, simply by an intensity-adjustment of the each pump light source. On the other hand, more than ±10% of loss difference would additionally require the adjustment of the wavelength spacing of plurality of pump light sources. As a consequence, it prevents to determine the wavelength spacing of pump light sources in advance and also results in increasing-number of optical devices, which causes a disadvantage in cost.

Figure 18:
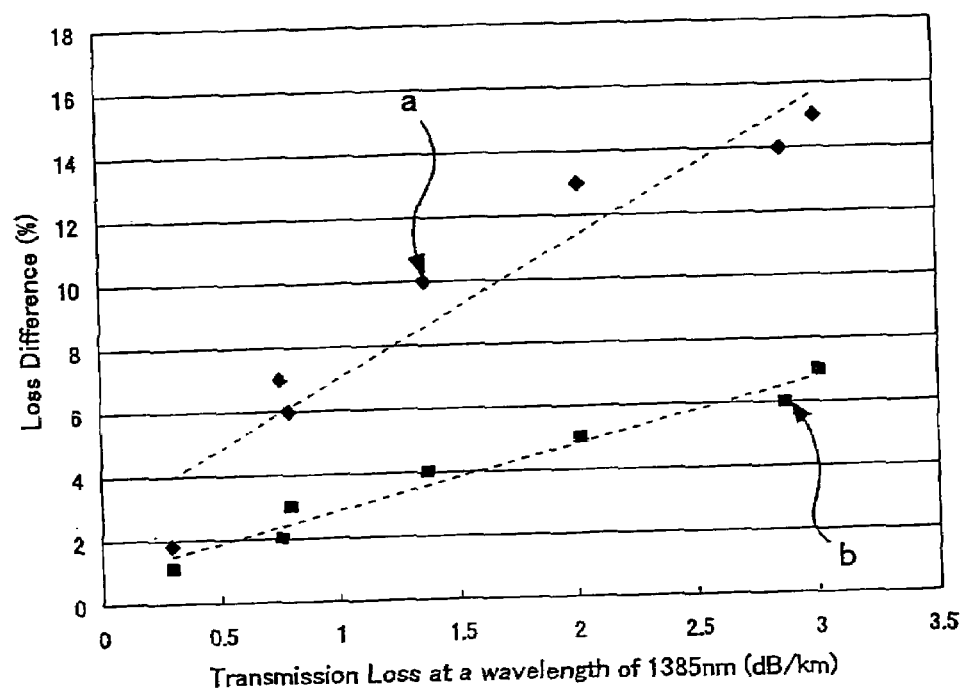
FIG. 18 draws transmission loss difference against transmission loss at 1385 nm in the fourth embodiment according to the present invention.

Curve "a" in FIG. 18 represents transmission loss at 1385 nm (absorption loss arising from hydroxyl ion) vs. Loss difference at 1420 to 1430 nm. Also, curve "b" snows transmission loss at 1385 nm vs. Loss difference at 1455 to 1465 nm. Here, the loss difference is defined as a difference of loss at an interval of 10 nm of wavelength in each wavelength band.

As apparent from Curves "a" and "b", the transmission loss of not more than 1.5 dB/km at 1385 nm should be made, so as to fall within ±10% of the transmission loss difference at an interval of 10 nm wavelength. Considering the wavelength dependence of transmission loss, the transmission loss difference should be suppressed to be ±10% or less over the wavelength range of 1420 to 1430 nm and 1455 to 1465 nm.

Figure 19A:
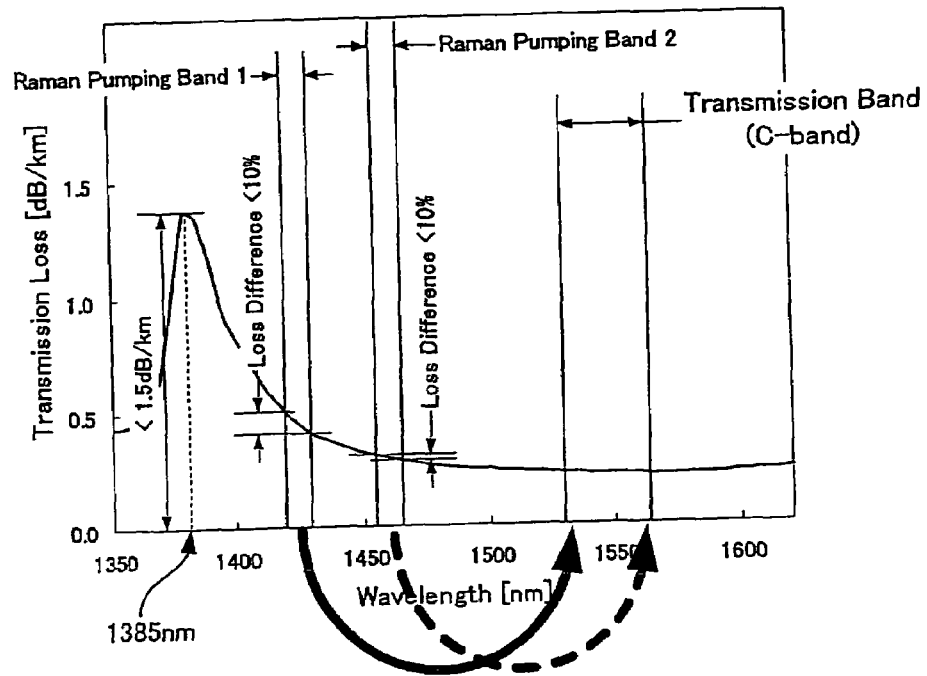
FIG. 19(a) shows a sample in the case of transmission loss at 1385 nm is 1.5 dB/km or lower
Figure 19B:
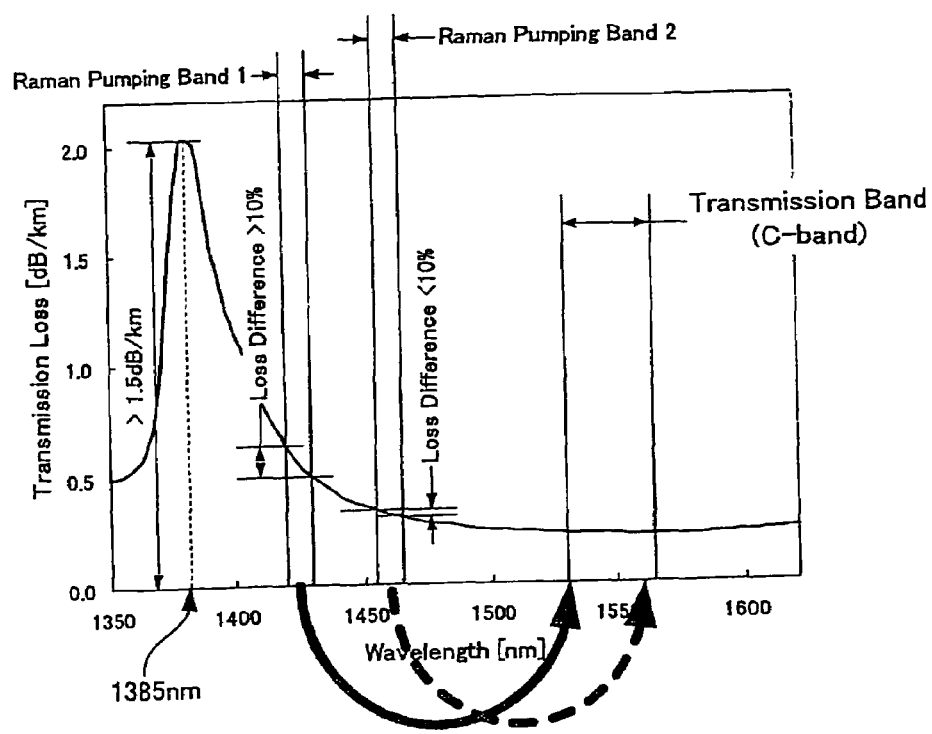
FIG. 19(b) shows a sample in the case of transmission loss at 1385 nm is 1.5 dB/km or higher.

FIG. 19(a) plots a characteristic curve: wavelength dependence of transmission loss, for an optical fiber with a transmission loss of not more than 1.5 dB/km at 1385 nm; FIG. 19(b) plots a characteristic curve: wavelength dependence of transmission loss for an optical fiber, with a transmission loss of more than 1.5 dB/km at 1385 nm.

Figure 20:
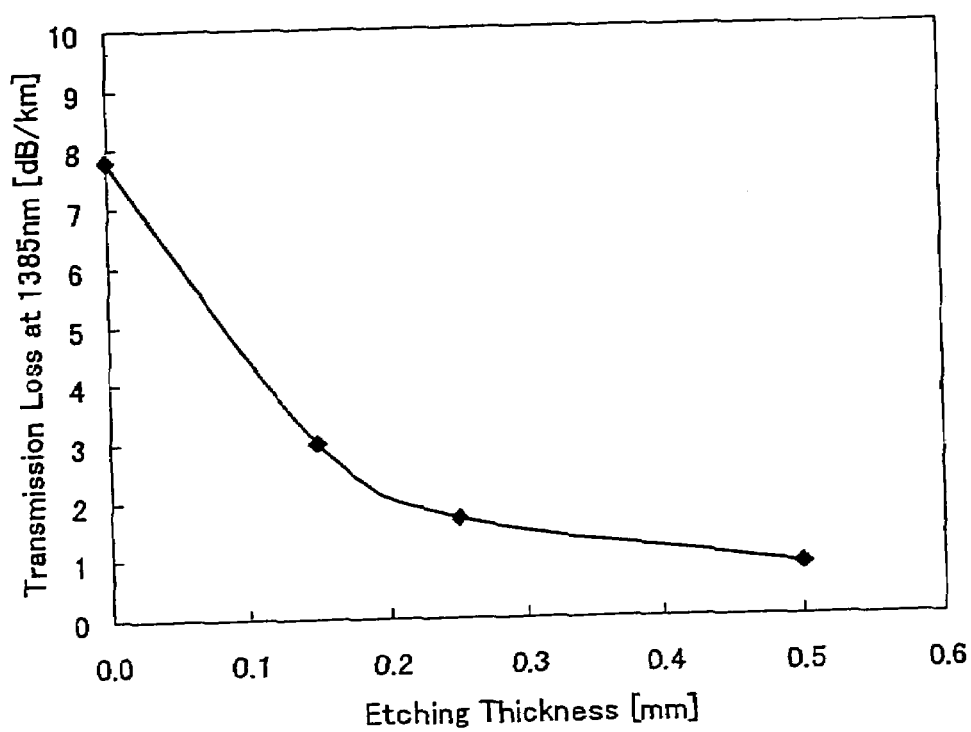
FIG. 20 draws transmission loss at 1385 nm vs. etching thickness of preform surface (HF: hydrofluoric acid) in the fourth embodiment according to the present invention.

FIG. 20 plots a relationship between transmission loss at 1385 nm and hydrofluoric acid etching thickness of the surface of optical fiber preform, whose first, second, and third layer are manufactured by VAD method, conforming to FIG. 17. Consequently, the removal of 1 mm from the surface can result in less than 1.5 dB/km of transmission loss increase at 1385 nm.

Accordingly, an optical fiber in the fourth embodiment which was etched more than 1 mm from the surface, turned out to have a transmission loss less than 1.5 dB/m at 1385 nm, making the transmission loss to fall within ±10% of loss difference in the pump light wavelength band.

The Raman amplification gain is inversely proportional to the effective area, and so considerably decreased by an extremely, large effective area. Therefore, an optical fiber in the fourth embodiment was adjusted, to an effective area of 60 $\mu mm^2$ or less at least at a predetermined wavelength within a wavelength range of 1460 nm to 1625 nm. Optical fibers in the fourth embodiment can suppress the reduction of Raman amplification efficiency both in distributed and discrete Raman amplifiers.

In addition; an extremely small effective area may cause signal distortion due to a non-linearity effect of self phase modulation (SPM) and cross phase modulation (XPM) etc. Then, the fourth embodiment applied an effective area of not less than 40 $\mu mm^2$ to suppress signal distortion due to SPM or XPM.

Also, a least dispersion at 1550 nm in the C band may lead into the FWM generation. Then, the fourth embodiment applied a dispersion of not less than 4 ps/nm/km at 1550 nm to suppress signal distortion due to FWM generation.

An optical fiber in the fourth embodiment was made to have a cutoff wavelength of 1550 nm or shorter to ensure single-mode transmission in the C-band.

For reference, shorter the cutoff wavelength, the better in transmission performance. It is desirable to apply a cutoff wavelength of 1450 nm or shorter, considering transmission systems with the Raman amplification.

As for WDM transmission, the increase in dispersion slope will result in the large dispersion difference over the wavelength band, bringing an adverse effect on high capacity and high speed transmission. That is, WDM transmission requires each of the optical fibers with a reduced dispersion slope to suppress the dispersion difference between the wavelength band.

As a result, an optical fiber in the fourth embodiment has a dispersion slope of positive and 0.050 ps/nm$^2$/km or less at least in a predetermined wavelength within a wavelength range of 1460 nm to 1625 nm. Also, an optical fiber in the fourth embodiment is made to have a zero-dispersion wavelength of 1460 nm or shorter. Then, optical fibers in the fourth embodiment can suppress signal distortion due to dispersion because of suppressed difference in dispersion over the wavelength band.

Moreover, an optical fiber in the fourth embodiment is preferably made to have a dispersion slope of positive and 0.025 ps/nm$^2$/km or less at least in a predetermined wavelength within a wavelength range of 1460 nm to 1625 nm, and a zero-dispersion wavelength of 1400 nm or shorter, considering the above mentioned dispersion slope vs. dispersion characteristics. Therefore, the optical fiber in the fourth embodiment realizes to suppress the dispersion difference and signal distortion due to dispersion more than ever.

In addition, an optical fiber having a large bending loss adversely affect when arranged in a module. However, an optical fiber in the fourth embodiment does not exceed 5 dB/m of bending loss in a bending diameter of 20 mm at 1550 nm. An optical fiber in the fourth embodiment, for example, enables coiling to be arranged in a module, with a least loss increase. Generally, the less in bending loss, the more reliable in performance.

Similarly, a large polarization-mode dispersion (PMD) leads into a considerable signal delay time in high-speed transmission. An optical fiber in the fourth embodiment has not more than 0.08 ps/√km at 1550 nm to be free from the PMD interference, and suitable for the Raman amplification.

Meanwhile, the present inventor has optimized the refractive index profiles in view of the above specified parameters and characteristics, as follows:

In short, concerning the refractive index profile in FIG. 17, it turned out that, when the relative refractive index difference of first layer 1 (Δ1), is made greater than 0.8%, a dispersion slope of positive and not more than 0.05 ps/nm$^2$/km and an effective area of 40 $\mu mm^2$ or more could not be realized; and at the same time that less than 0.3% of relative refractive index difference Δ1, would cause more than 5 dB/m of bending loss. As a result, the relative refractive index difference Δ1 was determined to be in a range between 0.3% and 0.8%.

Moreover, within the Δ1 range between 0.3% and 0.8%, an optimized value of "α" which allows an increase in the effective area, without increasing the dispersion slope, was found to be 4 or more. Similarly, more than −0.05% of relative refractive index difference of second layer 2 (Δ2) resulted in more than 0.05 ps/nm$^2$/km of dispersion slope, while less than −0.6% of relative refractive index difference (Δ2) resulted in less than 40 $\mu mm^2$ of effective area. As a result, the relative refractive index difference Δ2 was determined to a range between −0.6% and −0.05%.

When diameter "b" of second layer 2 is made to be more than 2.2 times diameter "a" of first layer 1, the dispersion slope exceeds 0.05 ps/nm$^2$/km. In contrast, when diameter "b" of second layer 2 is made to less than 1.5 times diameter "a" of first layer, the effective area falls less than 40 $\mu mm^2$. As a result, an appropriate value of "b/a" was determined to be in a range between 1.5 and 2.2.

Similarly, more than 0.4% of relative refractive index difference of third layer Δ3 results in longer than 1550 nm of cutoff wavelength, while less than 0.05% of relative refractive index difference Δ3 results in higher than 0.05 ps/nm$^2$/km of dispersion slope. As a result, the relative refractive index difference Δ3 was determined to be in a range between 0.0.5% and 0.4%.

Furthermore, when diameter "c" of third layer 3 is made to more than 3.5 times diameter "a" of first layer 1, the cutoff wavelength exceeds 1550 nm. Diameter "c" of third layer 3 is made to less than 2.2 times diameter "a" of first layer 1, the dispersion slope exceeds 0.05 ps/nm$^2$/km or the effective area falls less than 40 $\mu m^2$. As a result, a optimized value of "c/a" was determined to be in a range between 2.2 and 3.5.

The fourth embodiment has such excellent characteristics, and provides the optical fiber suitable for the WDM transmission with the Raman amplification in the C-band, by optimizing the refractive index profiles, as mentioned above.

In addition, optical transmission system applying optical fibers in the fourth embodiment as an optical transmission line provides high-quality WDM transmission with Raman amplifiers.

Table 7 presents optical fibers made on trial according to the forth embodiment.

TABLE 7

| | Dispersion | | | Dispersion slope | MFD | Aeff | Transmission loss | | | | | Bending loss |
|---|---|---|---|---|---|---|---|---|---|---|---|---|
| | 1460 nm | 1550 nm | 1620 nm | 1550 nm | 1550 nm | 1550 nm | 1385 nm | 1550 nm | λc | λo | PMD | 1550 nm |
| #7-1 | — | 4.8 | — | 0.0292 | 7.8 | 45.2 | 1.185 | 0.209 | 1159 | 1412 | 0.045 | 0.212 |
| #7-2 | — | 5.6 | — | 0.0293 | 8.0 | 47.8 | 0.893 | 0.207 | 1446 | 1393 | 0.048 | 0.021 |
| #7-3 | — | 4.6 | — | 0.0444 | 8.5 | 54.5 | 0.658 | 0.202 | 1070 | 1448 | 0.030 | 4.300 |
| #7-4 | — | 7.7 | — | 0.0226 | 7.6 | 43.8 | 1.457 | 0.211 | 1101 | 1353 | 0.053 | 3.210 |
| #7-5 | — | 8.8 | — | 0.0325 | 7.7 | 44.4 | 0.303 | 0.193 | 1222 | 1350 | 0.057 | 0.041 |
| #7-6 | 2.0 | 4.8 | 6.6 | 0.0252 | 7.8 | 45.2 | 1.185 | 0.209 | 1159 | 1402 | 0.045 | 0.212 |
| #7-7 | 2.2 | 4.2 | 5.0 | 0.0156 | 7.5 | 42.6 | 1.411 | 0.206 | 1156 | 1396 | 0.026 | 4.018 |
| #7-8 | 2.7 | 4.9 | 6.1 | 0.0200 | 7.6 | 44.5 | 0.983 | 0.211 | 1273 | 1387 | 0.027 | 0.914 |

Each, dispersion value is with a unit of ps/nmkm and each dispersion slope with ps/nm²/km. Measured wavelengths are shown above the columns of measurements.

Each MFD is mode filed diameter (μm), $A_{eff}$ is effective area (μm²), Loss is transmission loss (dB/km), Bend loss is bending loss in 20 mm diameter (dB/m), λc is cutoff wavelength (nm), λ0: is zero-dispersion wavelength (nm), and PMD is polarization mode dispersion (ps/√km)

Figure 21:
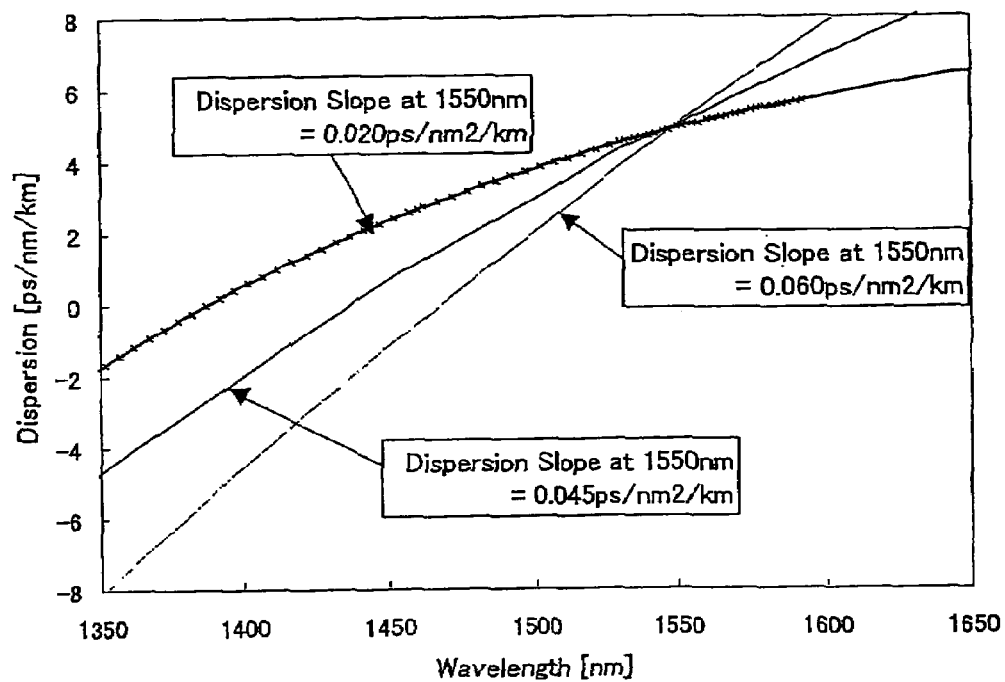
FIG. 21 draws wavelength characteristics of the chromatic dispersion for the optical fibers according to the present invention in the fourth embodiment according to the present invention and with a steep dispersion slope.

Curve "a" in FIG. 21 presents the wavelength dependence of dispersion for optical-fiber trial #7-8 in Table 8. Curves "b" and "c" (wavelength dependence of dispersion) resulted from optical fibers with 0.045 and 0.060 ps/nm²/km of dispersion slope, respectively. Each was with 4.9 ps/nm/km of dispersion.

As shown in curve "a" in FIG. 21, optical fiber trial #7-8 has a dispersion of +2 to +8 ps/nm/km over a broad wavelength band of the S-, C-, and L-band (1460 to 1625 nm). Then, optical-fiber trial #7-8 can suppress the FWM generation in these bands to carry out high-quality WDM transmission.

Thus, a dispersion of not less than 4 ps/nm/km at 1550 nm, and a dispersion, slope of positive and not more than 0.025 ps/nm²/km at a predetermined wavelength within a wavelength range of 1460 nm to 1625 nm, can realize a dispersion of 2 to +8 ps/nm/km over a broad range from the S-band to L-band. Therefore, optical-fiber trial #7-8 can suppress the FWM generation in these bands to carry out high-quality WDM transmission.

Curve "c" in FIG. 21 resulted from an optical fiber having the same dispersion as #7-8, which had a dispersion slope of 0.060 ps/nm²/km, around three times as large as that of #7-8. The rather high slope can make the dispersion too low in the S-band, inducing the FWM generation. Conversely, the dispersion can make the dispersion too large in the L-band, allowing signal distortion due to dispersion.

In addition. Curve "b" in FIG. 21 resulted from an optical fiber, which had a dispersion slope of 0.045 ps/nm²/km, somewhat larger than that of #7-8. The dispersion is expected to be slightly large in the L-band, but to fall to 2 ps/nm/km or less in the S-band, with more likely generation of the FWM. Notably, curve "b" is even more preferable than curve "c" in dispersion.

Figure 22A:
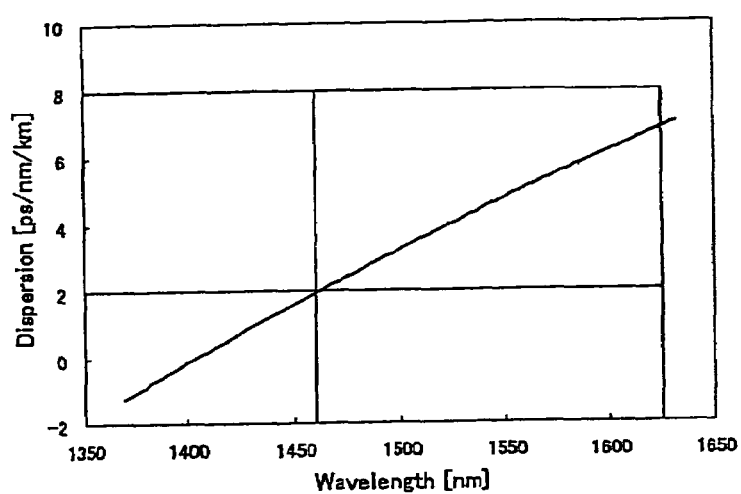
FIGS. 22(a)-(c) draw wavelength characteristics of the chromatic dispersion for the optical in the fourth embodiment according to the present invention.
Figure 22B:
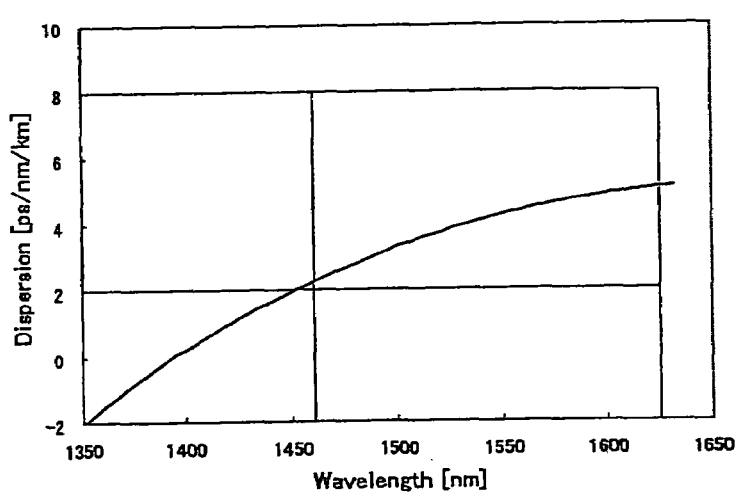
Figure 22C:
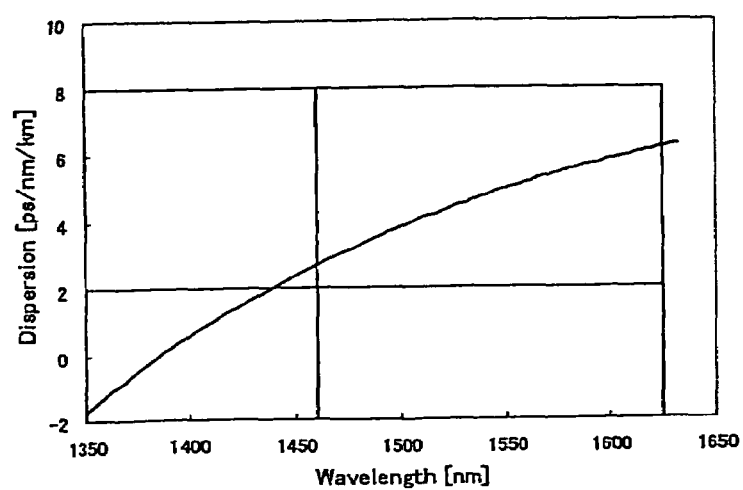

Curves "a", "b" and "c" in FIG. 22 are wavelength dependence characteristics in dispersion of optical-fiber trials (#7-6, #7-7 and #7-8) in Table 7. #7-6 and #7-7, similarly with #7-8, falls within a dispersion range of 2 to +8 ps/nm/km widely from the S-band to L-band, suppressing FWM interference or dispersion caused signal distortion and realizing high-quality WDM transmission.

Finally, the fourth embodiment cannot be limited to the examples which are shown and described in this specification, and can be embodied in other various construction. One of the above embodied optical fibers has a three-layered core of first second and third layers. But, a more than three-layered core can be designed for an optical fiber: a four-layered core, a five-layered core, and so on.

Meanwhile, optical fibers according to the fourth embodiment would preferably conform to the required values for bending loss, dispersion or transmission loss in the above embodiments, but may deviate more or less from them.

What is claimed is:

1. An optical fiber comprising a core and cladding, characterized by:
    an absolute value of dispersion of not less than 0.5 ps/nm/km and not more than 9 ps/nm/km over a wavelength range of 1430 nm to 1625 nm,
    an absolute value of dispersion slope of 0.04 ps/nm²/km or less at 1550 nm,
    a mode field diameter (MFD) of 7 μm or smaller at 1550 nm and
    a cable cutoff wavelength of 1430 nm or shorter.

2. The optical fiber of claim 1, which is further characterized by:
    an absolute value of dispersion slope of 0.03 ps/nm²/km or less at 1550 nm.

3. The optical fiber of claim 2, which is further characterized by:
    an absolute value of dispersion of not less than 0.5 ps/nm/km and not more than 9 ps/nm/km over a wavelength range of 1360 nm to 1625 nm and
    a cable cutoff wavelength of 1360 nm or shorter.

4. The optical fiber of claim 1, which is further characterized by:
    a transmission loss of 0.25 dB/km or less at 1550 nm.

5. The optical fiber of claim 1, which is further characterized by:
    a transmission loss of 1.0 dB/km or less at 1385 nm.

6. The optical fiber of claim 1, which is further characterized by:
    a transmission loss increase of 10% or lower at 1385 nm under a hydrogen atmosphere.

7. The optical fiber of claim 1, which is further characterized by:
    a polarization mode dispersion (PMD) of 0.5 ps/√km or less at 1550 nm.

8. The optical fiber of claim 1, which is further characterized by:
    a polarization mode dispersion (PMD) of 0.2 ps/√km or less at 1550 nm.

9. The optical fiber of claim 1, wherein:
    said core has at least two layers with a first layer at the center and a second layer surrounding said first layer;

the maximum of the relative refractive index difference of said first layer of is not less than 0.6% and not more than 1.6% with said cladding, and;

the relative refractive index difference of said second layer is negative with said cladding.

10. The optical fiber of claim 9, wherein:

all said layers of said core are formed by silica;

said first layer of said core is doped with at least germanium; and said second layer of said core is doped with at least fluorine.

11. The optical fiber of claim 10, wherein:

said first layer is doped with at least germanium and fluorine.

12. The optical fiber of claim 11, wherein:

said first layer and said second layer are doped with substantially the same amounts of fluorine.

13. The optical fiber of claims 9, wherein:

said first layer and said second layer are formed in one process.

14. The optical fiber of claim 13, wherein:

a cladding region whose diameter is more than two times that of said second layer is formed in the same process with said first layer and said second layer.

15. An optical transmission line comprising at least one optical fiber of claim 1 with a positive dispersion connected to at least one optical fiber of claim 1 with negative dispersion.

16. The optical transmission line of claim 15, which is further characterized by:

a dispersion of substantially zero (0) at least at a predetermined wavelength within a range of 1460 nm to 1625 nm.

17. The optical transmission line of claim 16, further comprising a plurality of optical fibers of claim 1 longitudinally connected in series between the transmitter and receiver sides, wherein, among said plurality of optical fibers, optical fiber having the largest mode field diameter are not positioned next to said receiver side.

18. The optical transmission line of claim 16, further comprising an average dispersion is not less than −1.0 ps/nm/km and not more than 1.0 ps/nm/km at least at a predetermined wavelength within a range of 1460 nm to 1625 nm.

19. The optical transmission line of claim 18, further comprising a signal light source and a pump light source which has a different wavelength from said signal light.

* * * * *